(12) United States Patent
Phillips et al.

(10) Patent No.: US 12,139,420 B2
(45) Date of Patent: Nov. 12, 2024

(54) METHOD AND APPARATUS FOR SEPARATION OF A SUBSTANCE FROM WATER

(71) Applicant: Opec Remediation Technologies Pty Limited, Hornsby (AU)

(72) Inventors: Steven Edward Phillips, Hornsby (AU); David John Burns, Hornsby (AU)

(73) Assignee: OPEC Remediation Technologies Pty Limited (AU)

( * ) Notice: Subject to any disclaimer, the term of this patent is extended or adjusted under 35 U.S.C. 154(b) by 734 days.

(21) Appl. No.: 16/771,199

(22) PCT Filed: Dec. 10, 2018

(86) PCT No.: PCT/IB2018/059830
§ 371 (c)(1),
(2) Date: Jun. 9, 2020

(87) PCT Pub. No.: WO2019/111238
PCT Pub. Date: Jun. 13, 2019

(65) Prior Publication Data
US 2021/0300789 A1    Sep. 30, 2021

(30) Foreign Application Priority Data

Dec. 9, 2017 (AU) ................................ 2017904954
Oct. 25, 2018 (AU) ................................ 2018904046

(51) Int. Cl.
*C02F 1/24* (2023.01)
*C02F 101/36* (2006.01)
*C02F 103/06* (2006.01)

(52) U.S. Cl.
CPC ............ *C02F 1/24* (2013.01); *C02F 2101/36* (2013.01); *C02F 2103/06* (2013.01);
(Continued)

(58) Field of Classification Search
None
See application file for complete search history.

(56) References Cited

U.S. PATENT DOCUMENTS 3,498,674 A    3/1970    Matthews
4,126,546 A *  11/1978   Hjelmner ............... B01D 24/36
                                                      210/744
(Continued)

FOREIGN PATENT DOCUMENTS

AU    2017276819 A1    12/2017
CN    1427802 A        7/2003
(Continued)

OTHER PUBLICATIONS

Ebersbach, I. et al., 'An alternative treatment method for fluorosurfactant-containing wastewater by aerosol-mediated separation', May 24, 2016, Water Research, vol. 101, pp. 333-340.
(Continued)

*Primary Examiner* — Richard C Gurtowski
(74) *Attorney, Agent, or Firm* — Morriss O'Bryant; Compagni Cannon, PLLC.

(57) ABSTRACT

A method and apparatus is disclosed for separating an amount of a perfluoroalkyl or polyfluoroalkyl substance (PFAS) from water which is contaminated with the substance. The method comprises the steps of: admitting an amount of the water, which includes an initial concentration of the substance, into a chamber via an inlet thereto, and introducing a flow of gas into the chamber. The introduced gas induces the water in the chamber to flow, and produces a froth layer which is formed at, and which rises above, an interface with the said flow of water and of introduced gas in the chamber. The froth layer includes an amount of water, and also a concentrated amount of the substance in comparison compared with its initial concentration. The step of
(Continued)

removal of at least some of the froth layer from an upper portion of the chamber occurs.

16 Claims, 12 Drawing Sheets

(52) U.S. Cl.
CPC ...... *C02F 2209/38* (2013.01); *C02F 2209/40* (2013.01); *C02F 2209/42* (2013.01)

(56) References Cited

U.S. PATENT DOCUMENTS

| | | | | |
|---|---|---|---|---|
| 4,203,837 | A | * | 5/1980 | Hoge ........................ C02F 1/24 |
| | | | | 210/705 |
| 5,147,535 | A | | 9/1992 | Bernhardt |
| 5,389,267 | A | | 2/1995 | Gorelick |
| 5,530,655 | A | | 6/1996 | Lokhoff et al. |
| 5,620,593 | A | | 4/1997 | Stagner |
| 2014/0001102 | A1 | * | 1/2014 | Blendinger ............ B03D 1/028 |
| | | | | 209/164 |
| 2014/0246366 | A1 | | 9/2014 | Kerfoot |

FOREIGN PATENT DOCUMENTS

| | | |
|---|---|---|
| CN | 103596695 A | 2/2014 |
| DE | 102012200958 A1 | 7/2013 |
| EP | 0613725 A2 | 9/1994 |
| GB | 2185901 A | 8/1987 |
| WO | 2017098401 A1 | 6/2017 |
| WO | 2017218335 A1 | 12/2017 |

OTHER PUBLICATIONS

Lee, Y. et al., 'Recovery of perfluorooctane sulfonate (PFOS) and perfluorooctanoate (PFOA) from dilute water solution by foam flotation', Sep. 21, 2016, Separation and Purification Technology, vol. 173, pp. 280-285.

European Search Report, issued Jul. 12, 2021, re European Application No. 18886120.7.

European Search Report, issued Dec. 1, 2022, re European Application No. 18886120.7.

* cited by examiner

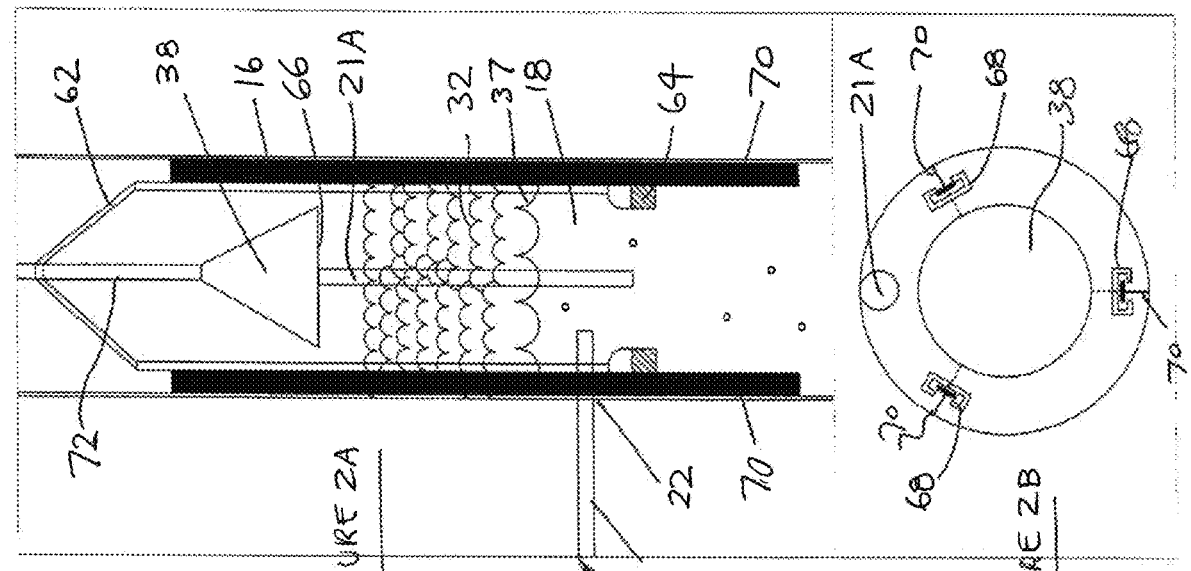
FIGURE 2A
FIGURE 2B
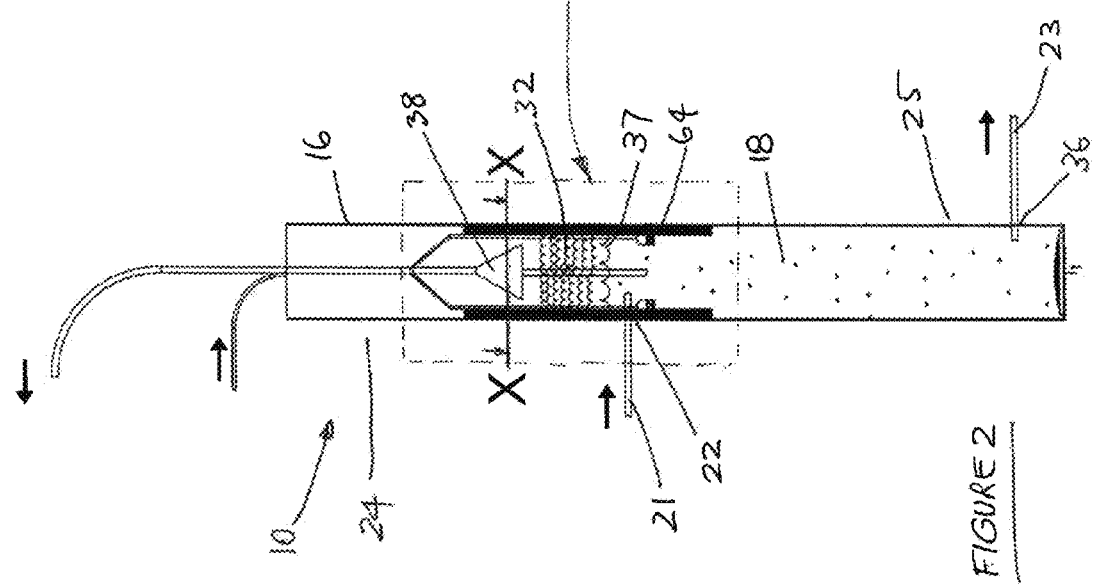
FIGURE 2

FIG 8A (above) and FIG 8B (below, inset detail)

METHOD AND APPARATUS FOR SEPARATION OF A SUBSTANCE FROM WATER

CROSS REFERENCE TO RELATED APPLICATIONS

This application is a national stage application filed under 35 U.S.C. § 371 from PCT/IB2018/059830, filed on Dec. 10, 2018, and claims priority to Australian Application No. 2017904954, filed Dec. 9, 2017, and also claims priority to Australian Application No. 2018904046, filed Oct. 25, 2018, the contents of each of which is incorporated herein by reference.

TECHNICAL FIELD

This disclosure relates to an apparatus for separation of a substance from water and to a method for use of the separation apparatus. In one form, the apparatus and method can be applied to removal of contaminant organic material present in groundwater which has been extracted from a body of ground. However, the apparatus and method can also be applied to the removal of non-organic materials or contaminants from all types of contaminated water sources.

BACKGROUND OF THE DISCLOSURE

Perfluoroalkyl or polyfluoroalkyl substances (PFAS) embody a range of poly fluorinated alkyl substances (including but not limited to carboxylic acids, alkyl sulfonates, alkyl sulfonamido compounds and fluoro telemeric compounds of differing carbon chain lengths and precursors of these). PFAS have found use in a wide variety of applications including as a specialised fire-fighting product, or for impregnation or coating of textiles, leather and carpet, or for carpet cleaning compounds, as well as in aviation hydraulic fluids, metal plating, agricultural (insect traps for certain types of ants), photo-imaging, electronics manufacture and non-stick cookware applications.

Higher order PFAS degrade to specific end-point PFAS chemicals (including but not limited to perfluorooctane sulfonate (PFOS), perfluorooctanoic acid (PFOA) and perfluorohexane sulfonate (PFHxS). These priority compounds of concern are resistant to biotic or abiotic degradation and thus are persistent in the environment. They are recalcitrant, bio-accumulative and known to have contaminated soils, groundwaters and drinking water supplies.

PFAS are known to have contaminated groundwater, including drinking water supplies. PFOS, PFHxS, and PFOA have published human health and environmental regulatory criteria in most developed world jurisdictions. Additional PFAS compounds are expected to be identified as contaminants of concern as new research toxicology data indicates potential risk associations. Remedial methods are needed to treat priority PFAS compounds.

Technology used to remove volatile organic compounds (VOC) by bubbling air through groundwater or in groundwater wells (also known as "air stripping") is known in a number of publications. However, it is also known that such techniques do not work to treat groundwater with PFAS contamination. In a recent study, data is presented from a US location contaminated by PFAS where air-stripping had been previously used to remove VOCs, but more than 25 years after that activity, the site under investigation still had high, persistent PFAS contamination requiring remediation (*Environ. Sci. Pollut. Res* (2013) 20:1977-1992 pp). While they are soluble, most long-chain PFAS (including PFOS and PFOA have a low, to very low, vapour pressure, which means they do not volatilise easily, so air-stripping is therefore not an ineffective remedial treatment.

Known technology used to treat PFAS contaminated groundwater is based on two approaches: "pump and treat" and "in-situ chemical treatment".

"Pump and treat" is a conventional approach of pumping groundwater via extraction wells drilled into the ground to the surface, then treating the collected water. The treated water is then directed toward a suitable endpoint, for example for irrigation or re-injection back into the ground (which in many locations is not permissible), or by disposal into a sewerage or a waste treatment facility. This technique is costly because of the expense of transporting large quantities of water from place to place.

In such an approach, there are a wide variety of technologies used by waste facilities to treat water containing PFAS, including any or a combination of the following: (a) absorption by passage through activated carbon media, most commonly in the form of granular activated carbon (GAC); (b) absorption by passage through a clay based media; (c) filtration by reverse osmosis (RO) membranes, and (d) absorption by passage through ion exchange resin. In general, the treatment agents used in these technologies are either sensitive to fouling by non-compatible substances or cannot be easily regenerated and require disposal (typically to landfill) after they have reached maximum capacity.

There are currently no commercially viable technologies available using chemical approaches that are capable of degrading or destroying many of the key PFAS compounds of concern where they are present in low concentrations in large volumes of water.

Pump and treat systems are usually required to operate for extended periods over many years, and the treatment volumes are very large—as a result, the treatment plant equipment is also large. Capital and operating costs are typically high due to treatment plant size and long operational time periods (years, or even decades).

"In-situ chemical treatment" typically involves sub-surface application of a reactive agent which denatures or neutralises the target contaminant (PFAS). Subsurface application of the agent may include direct injection as a concentrated liquid, slurry or gas, or excavation/construction of a sub-surface barrier wall. The reactive agent may be oxidising (for example, hydrogen peroxide, persulfate or permanganate), reductive (for example, zero valent iron) or adsorptive (for example, superfine GAC slurry, clay). However, PFAS are recalcitrant, and laboratory studies have found limited success with performance of these reagents. Laboratory studies have also found that adsorption of PFAS by GAC is reversible (that is, not permanent).

Groundwater wells are known in the art to allow the circulation below the subsurface by moving groundwater using pumping methods within a well chamber. Such wells can involve complex, multiple screen sections in side walls, which may need to be separated by packers or low permeability barriers. Traditionally such wells have been used to treat groundwater containing volatile compounds, followed by vapour extraction, or to oxygenate the ground which surrounds a well, for example for purposes of in-situ aerobic bioremediation, or to introduce other liquid or colloidal substances into the groundwater.

It has become apparent that there are no suitable technologies which overcome the cost, scale and risk of the known techniques when applying them to try to neutralise PFAS.

SUMMARY

In a first aspect there is provided a method of separating an amount of a substance from water which is contaminated with the substance, the method comprising the steps of: admitting an amount of the water, which includes an initial concentration of the substance, into a chamber via an inlet thereinto; introducing a flow of gas into the chamber, wherein said introduced gas induces the water in the chamber to flow, and produces a froth layer which is formed at, and which rises above, an interface with the said flow of water and of introduced gas in the chamber, the froth layer including an amount of water and also a concentrated amount of the substance when compared with its initial concentration; controlling the water content of the froth layer which rises above the interface to influence the concentration of the substance therein; and removing at least some of the froth layer from an upper portion of the chamber.

In certain embodiments, the flow of gas and the production of the froth layer is continuous. The operation can also be conducted in batch mode for specific treatment situations, as will be described for the experimental examples in this document.

In some embodiments, the step of controlling the water content of the froth layer is by of the group comprising: controlling a physical parameter of the flow of introduced gas; and controlling a physical parameter of the froth layer.

In some embodiments, the step of controlling a physical parameter of the flow of introduced gas comprises use of a flow controller and an inlet valve for controlling the flow of said introduced gas into the chamber. If too much gas is introduced into the chamber, the flow of water can move away from its ideal treatment condition of quiescent flow, and instead become turbulent. In turbulent situations, the froth layer can become disrupted and can also become very wet and thus cause dilution of the concentration of the substance that is being removed from the water.

In some embodiments, the step of controlling a physical parameter of the flow of introduced gas comprises using one or more gas inlet flow pipes which are arranged to extend into the chamber interior and adapted for inducing a generally rotational or swirling flow of said introduced gas and water, said swirling flow having an axis of rotation aligned with an elongate axis of the chamber.

In some embodiments, the generally rotational or swirling flow of said introduced gas and water within the chamber is laminar at the interior circumferential wall of the chamber.

In some embodiments, the step of controlling a physical parameter of the flow of introduced gas comprises use of a bubble generation device located prior to, or at the point, when said introduced gas enters the water located in the chamber. Bubble generation devices can include air bubblers (or equivalent nomenclature such as spargers, frits, aerators, aeration diffusers, air stones and the like) located within the chamber and in contact with the water. Another type of bubble generation device can involve inducing air into a flow of water passing through a venturi expander for example, to create fine air bubbles in situ, and then passing this aerated flow into the chamber. This latter embodiment is employed by the present inventor for its ease and simplicity and as a way of maximising air delivery into the chamber.

In some embodiments, the upward flow of gas is introduced into a lower portion of the chamber, although of course it is possible for gas to also be introduced at several positions along the depth of the chamber. As will be shown in the examples of the present disclosure, the number of entry points for air bubbles to be contacted with the water in the interior of the chamber can be at any number of positions via pipes through the chamber wall.

In some embodiments, the step of controlling a physical parameter of the froth layer comprises the use of a froth depth regulation device for maintaining a depth of the froth layer above the interface, the froth depth regulation device being arranged at a fixed location within the chamber, and the location of the interface is responsive to at least one of the flow of the introduced gas, and an inlet flow of the water. This is especially convenient and simple when operating a process in a batch style mode.

In some alternative embodiments, the step of controlling a physical parameter of the froth layer comprises the use of a froth depth regulation device for maintaining a depth of the froth layer above the interface, the device being arranged to be moveably positionable within the chamber in response to movement of the location of the interface. Those froth depth regulation devices which are moveable within the chamber in response to movement of the location of the interface have the advantage of operating with a constant depth of froth layer which is known to give adequate froth layer drainage characteristics. Such devices are arranged to be buoyant, and to be self-locating at the water/froth layer interface irrespective of the overall level of water in the chamber. However, in turbulent fluid flow situations, stability of the level control provided by a floating device can be more uncertain.

In certain embodiments, the step of controlling a physical parameter of the froth layer further comprises use of a device for confining the cross-sectional flow path of the froth in the upper portion of the chamber, resulting in drainage of said froth layer. Apparatus which is shaped to confine or squeeze a rising froth layer can cause additional drainage of the froth layer, and may include changes to the cross-sectional open area of froth flow, for example by the use of froth crowders, narrow necked passages or channels or capillaries, tapered funnels, weir skimmers, for example.

In some embodiments, the froth layer is collapsed during said removal step from the upper portion of the chamber, and prior to undergoing a secondary treatment step. In one form of this, the froth layer is collapsed during said removal step from the upper portion of the chamber, and prior to undergoing a secondary treatment step. In some specific examples, the froth layer is collapsed by using mechanical apparatus from the group comprising: a foam breaker, a vacuum extraction device, and a froth extraction head.

Froth depth regulation devices which are arranged at a fixed location within the chamber require constant adjustment of the location of the interface, which is readily changed by altering, for example, the flow of the introduced gas or by altering the relative rates of the water inflow/outflows (in a continuous process system). A liquid level sensor can signal whether the water level is too high or too low, and control the flow of the introduced gas or water inflows/outflows to displace an amount of the water to raise the static height of the water level to a desirable dynamic (operating) height and a depth of froth layer which is known to give adequate froth layer drainage characteristics.

In some embodiments, the method further comprises the step of removal of at least some of the froth layer from the upper portion of the chamber. This step may be done intermittently rather than on a continuous basis, for example in batch style operations.

In some embodiments, the secondary treatment step for treating the collapsed froth layer including the concentrated substance uses at least one of the processes of the group comprising: absorption (using activated carbon, clay, or ion exchange resins), filtration (using reverse osmosis membranes); vacuum distillation; drum drying; and introduction of further quantity of gas into a separate containment apparatus to produce another froth layer comprising a further concentrated amount of the substance, this latter step being essentially a repeat of the concentration step which took place in the chamber, in order to further reduce the volume of concentrate which needs to be transported from the treatment site, or otherwise treated.

In some embodiments, the substance is organic, and in one form the organic substance is at least one of a perfluoroalkyl substance or a polyfluoroalkyl substance (PFAS). More specifically, the perfluoroalkyl or polyfluoroalkyl substance (PFAS) includes one or more of the group comprising: perfluoro-octane sulfonate (PFOS); perfluoro-octanoic acid (PFOA); perfluoro-n-hexane sulfonic acid (PFHxS); perfluoro-nonanoic acid (PFNA); perfluoro-decanoic acid (PFDA/Ndfda); 6:2-fluorotelomer sulphonate compounds (6:2 FTS); 8:2-fluorotelomer sulphonate compounds (8:2 FTS); and perfluoro-octanoic acid (PFHpA); poly fluorinated carboxylic acids, alkyl sulfonates and alkyl sulfonamido compounds; and fluorotelemeric compounds, each having differing carbon chain lengths; and including precursors of these.

In a second aspect, there is provided an apparatus for separating an amount of a substance from water which is contaminated with the substance, the apparatus comprising: a chamber having an inlet which is arranged in use to admit thereinto an amount of the contaminated water which includes an initial concentration of the substance; a gas introduction device which in use admits gas into the chamber, the introduced gas for inducing water to flow within the chamber, and for producing a froth layer which is formed at, and which rises above an interface with the said flow of water and introduced gas in the chamber, the froth layer including an amount of water and also a concentrated amount of the substance when compared with its initial concentration; wherein the apparatus is arranged in use to contain the froth layer near an upper portion of the chamber and to control the water content of the froth layer which rises above the interface, to influence the concentration of the substance therein; and a device for removing at least some of the froth layer from the upper portion of the chamber.

In some embodiments, the inlet is arranged in use for admission of the contaminated water to the chamber at an uppermost region thereof.

In some embodiments, an outlet is arranged in use for egress of water from the chamber at or near a lowermost region thereof, thereby setting up a flow of water in the chamber which is counter-current to the rising air flow.

In some embodiments, the said outlet can be in fluid communication with an inlet of a further chamber, said inlet being located at a respective uppermost region thereof.

In some alternative embodiments, the said outlet is in fluid communication with an inlet of a downstream process feed tank for a surface absorption scavenging stage utilising activated carbon or ion exchange resin, or the like.

In some embodiments, the chamber comprises an elongate cylindrical vessel, but there are many possible shapes of chamber tank such as cubes, columns, or even basic cylindrical designs of any cross-section—round, oval, square for example.

In some embodiments a bubble generation device is located prior to or at the point when the flow of introduced gas enters the water located in the chamber.

In some embodiments, said gas introduction device comprises one or more gas inlet flow pipes which are arranged about a circumferential peripheral wall of the chamber and which extend into an interior of the chamber via a respective opening in said peripheral wall, in use for admitting gas into the chamber.

In one particular embodiment of this, the distal end of the one or more gas inlet flow pipes which extend into the chamber interior are adapted for inducing a generally rotational or swirling flow of said introduced gas and water with an axis of rotation aligned with an elongate axis of the chamber, said swirling flow being generally laminar along the interior peripheral wall of the chamber. In one form of this, the adaptation of the distal end of the or each gas inlet flow for inducing said rotational or swirling flow within the chamber is a 90 angle degree pipe bend which discharges the gas inlet flow in a direction which is generally tangential to the chamber interior side wall at any gas inlet pipe location.

In some embodiments, the apparatus used for providing control of the water content of the froth layer comprises apparatus for at least one of: controlling a physical parameter of the flow of introduced gas; and controlling a physical parameter of the froth layer.

In some embodiments, the apparatus used for control of a physical parameter of the flow of introduced gas into the chamber comprises the use of a flow controller and an inlet valve on a gas delivery line, responsive to a measurement of one of the group comprising: water content of the froth layer; froth stability of the froth layer; location of the interface in the chamber.

In some embodiments, the apparatus used for the control of a physical parameter of the froth layer, comprises the use of a froth depth regulation device for maintaining a depth of the froth layer above the interface, wherein the froth depth regulation device is selected from the group comprising: a device which is moveably positionable within the chamber in response to movement of the location of the interface; and a device which is arranged at a fixed location within the chamber, and the location of the interface is responsive to at least one of the flow of the introduced gas, and an inlet flow of the water.

In some embodiments, the froth depth regulation device is arranged for confining the cross-sectional flow path of the froth in the chamber, resulting in froth confinement and drainage of said froth layer. Apparatus which is shaped to confine or squeeze a rising froth layer can cause additional drainage of the froth layer, and may include changes to the cross-sectional open area of froth flow, for example by the use of froth crowders, narrow necked passages or channels or capillaries, tapered funnels, weir skimmers, for example.

In some embodiments, the apparatus further comprises a froth layer removal device in which at least some of the froth layer is collapsed during removal of at least some of the froth layer from the uppermost region of the chamber, and prior to a secondary treatment step. In some particular embodiments, the froth layer collapse device includes mechanical apparatus from the group comprising: a foam breaker, a vacuum extraction device, and a froth extraction head.

In some embodiments, the apparatus further comprises a secondary treatment device in use for treating the collapsed froth layer for removal of the concentrated substance, wherein the treatment device includes at least one of the group comprising: absorption (using activated carbon, clay, or ion exchange resins), filtration (using reverse osmosis membranes); vacuum distillation; drum drying; and introduction of further quantity of gas into a separate containment apparatus to produce another froth layer comprising a further concentrated amount of the substance, this latter step being essentially a repeat of the concentration step which took place in the first stage separation chamber(s), for the advantages previously recited in relation to the method of use of the apparatus.

In some embodiments, the froth depth regulation device comprises: a main body which is positioned in use within the chamber of the said apparatus, the main body including a cavity having an open mouth which is arranged in use to face downwardly into the chamber such that the open mouth receives a froth layer which rises within the chamber above the interface with the water; an outer periphery of either the open mouth, or of an exterior surface of the main body, being dimensioned to be in a close-facing relationship with an interior wall of the chamber, such that the froth layer is substantially directed into the open mouth; and the main body cavity having an uppermost in use exit opening via which the froth layer travels or is removed for further processing via an exit conduit.

Throughout this specification, the term "close-facing" means two closely cooperating surfaces of similar surface shape, but spaced apart functionally to allow a small gap between the interior wall of the chamber and an outer periphery of the body of the froth depth regulation device. This gap will be necessary to let the vacuum suck in ambient air from the uppermost region of the chamber and draw the froth up toward the froth depth regulation device.

In some embodiments, the cavity has an internal shape which tapers inwardly when moving from the region of the open mouth toward the exit opening to facilitate froth layer crowding and drainage or collapse. In other forms, depending on the application, the length of the cavity within the body of device can be of various sizes to modify the distance between the interface and the exit opening. The greater the distance the exit opening is away from the froth layer is a further way of adjusting how dry the froth can be, by drainage and exclusion of carryover water which can dilute the PFAS concentration in the froth. In still further embodiments, there may be a number of froth depth regulation devices having various shapes of open mouths, and/or various different internal cavity shapes, with those multiple devices spaced across the width of the elongate chamber, in situations where larger diameter flotation chambers are contemplated.

In some embodiments, the exit conduit operatively connects to said secondary treatment device.

In some embodiments, the froth depth regulation device includes a movement guidance system so that the device is moveably positionable in relation to the chamber along a vertical axis of movement.

In some embodiments, the movement guidance system includes a frame which is received in, and which slides along, one or more elongate tracks arranged at the interior wall of the chamber, and the main body and/or the exit conduit is operatively connected to said frame.

In some embodiments, the movement guidance system is located within the chamber.

In some embodiments, the frame is fitted with one or more buoyancy elements which in use cause it to float on the water in the chamber, and thereby position the main body in relation to the interface.

In some embodiments, the frame is fitted with one or more ballast elements which in use cause it to sink below the water in the chamber, and thereby position the main body in relation to the interface.

In some embodiments, the inlet which is arranged in use to admit contaminated water into the chamber is a conduit which is connected to the frame and which extends below the main body.

In alternative embodiments, the movement guidance system includes a mechanically or electrically-driven mounting which is received in the uppermost portion of the chamber, via which the exit conduit, and thus the main body to which the exit conduit is operatively connected, can be raised or lowered in relation to the chamber.

In an alternative embodiment, the apparatus used to control the water content of the froth layer is arranged at a fixed location within the chamber, and the location of the interface is adjustable responsive to the flow of the introduced gas, so that the froth depth can be stably positioned relative to the apparatus. In one particular embodiment, the apparatus used to control the water content of the froth layer comprises a flow controller and an inlet valve on a gas delivery line for controlling the flow of the introduced gas. In another particular embodiment, the apparatus used to control the water content of the froth layer further comprises a bubble generation device located prior to or at the point when the flow of introduced gas in the gas delivery line enters the water located in the chamber. In another particular embodiment (suited only to a continuous flow treatment) the location interface is managed by valves on the inflow and outflow lines which are adjusted to change the relative water inflow and outflow rates from the chamber.

In some embodiments, the apparatus used to control the water content of the froth layer can comprise further devices for controlling a physical parameter of the froth layer. In one form of this, the said device controls the cross-sectional flow path of the froth in the chamber, resulting in froth confinement and drainage. Apparatus which is shaped to confine or squeeze a rising froth layer can cause additional drainage of the froth layer, and may include changes to the cross-sectional open area of froth flow, for example by the use of froth crowders, narrow necked passages or channels or capillaries, tapered funnels, weir skimmers, for example.

In a third aspect, there is provided a method of separating an amount of a substance from water which is contaminated with the substance, the method comprising the steps of: admitting said contaminated water into a chamber via an inlet thereinto; introducing a flow of gas into a lowermost region of the chamber, wherein the introduced gas induces an upward flow of water in the chamber, and produces a froth layer which rises above an interface with the water in an upper portion of the chamber, the froth layer including a concentrated amount of the substance when compared with its concentration in the contaminated water first admitted to the chamber; collecting a sufficient amount of said froth layer and, after allowing it to collapse back into a liquid form, passing said liquid to a second chamber via an inlet thereinto; introducing a flow of gas into a lowermost region of the second chamber, wherein the introduced gas induces an upward flow of water in said chamber, and produces a froth layer which rises above an interface with the water in an upper portion of the second chamber, the froth layer including a further concentrated amount of the substance; and in said second chamber, regulating at least one of (i) depth of the froth layer above the interface using a froth layer depth regulation system, and (ii) depth of water in the chamber, said regulation being responsive to movement of the location of the interface; such that the water content of the froth layer near the uppermost region of the second chamber is controlled, to influence the concentration of the substance therein.

In some embodiments, for at least one of the first or the second chambers, the upward flow of gas and the production of the froth layer occurs in a batchwise operational manner.

In some embodiments, the step of controlling the water content of the froth layer in the upper region of a chamber is by at least one of the group comprising: controlling a physical parameter of the flow of introduced gas; and controlling a physical parameter of the froth layer.

In some embodiments, the step of controlling the depth of water in a chamber is by at least one of the group comprising: controlling a physical parameter of the flow of introduced gas; and controlling an inlet flow of additional water.

In some embodiments, the steps of the method of the third aspect are otherwise as defined for the first aspect.

In a fourth aspect, there is provided an apparatus for separating an amount of a substance from water which is contaminated with the substance, the apparatus comprising: a chamber having an inlet which is arranged in use to admit contaminated water thereinto; a gas introduction device located in a lowermost region of the chamber which in use admits gas into the chamber, the introduced gas for inducing water to circulate from a region near the lowermost region toward an uppermost region of the chamber, and for producing a froth layer which rises above an interface with the water, a layer which includes a concentrated amount of the substance; and at least one of: (i) a froth depth regulation device, in use to maintain the depth of the froth layer above the interface, and (ii) a water depth regulation device, in use to maintain the depth of water in the chamber, such regulation devices being responsive to movement in the location of the interface, wherein the system is arranged in use to contain the froth layer near the uppermost region of the chamber and to control the water content of the froth layer, to influence the concentration of the substance therein.

In some embodiments, the froth depth regulation system comprises: a main body which is positioned in use within the chamber of the said apparatus, the main body including a cavity which is arranged in use to face downwardly into the chamber such that the cavity receives a froth layer which rises within the chamber above the interface with the water; an outer periphery of the cavity, and/or of an exterior surface of the main body, being dimensioned to be in a close-facing relationship with an interior wall of the chamber, such that the froth layer is substantially directed into the cavity; and said cavity having an uppermost in use exit opening, via which the froth layer travels or is removed for further processing via an exit conduit.

In some embodiments, the water depth regulation system further comprises a pump which is responsive to movement of the location of the interface, in use to maintain the depth of the water below the interface by introducing liquid into the chamber to replace liquid which, over time, is removed into the froth layer.

In some embodiments, the apparatus of the fourth aspect has features which are otherwise as defined for the second aspect.

In a fifth aspect, there is provided a method of separating an amount of a primary organic substance from water which is contaminated initially with said primary organic substance and a secondary organic substance by use of a method of aerated foam separation, during which the majority of the primary organic substance is removed from the water and the majority of the secondary substance is not, wherein the primary organic substance comprises at least one of the group: perfluoro-octane sulfonate (PFOS); perfluoro-octanoic acid (PFOA); perfluoro-n-hexane sulfonic acid (PFHxS); perfluorononanoic acid (PFNA); perfluorodecanoic acid (PFDA/Ndfda); 6:2-fluorotelomer sulphonate compounds (6:2 FTS); 8:2-fluorotelomer sulphonate compounds (8:2 FTS); and perfluoro-octanoic acid (PFHpA); and wherein the secondary organic substance comprises at least one of the group: perfluoro-hexanoic acid (PFHxA); perfluoro-butane sulfonic acid, (PFBS); and perfluoro-pentane sulfonic acid (PFBeS).

In some embodiments, the steps of the method of the fifth aspect are otherwise as defined for the first aspect.

In a sixth aspect, there is provided a method of separating an amount of an organic substance from an amount of water which is contaminated initially with said primary organic substance, the method comprising the step of: (i) introducing a flow of gas into a vessel containing the water to produce a froth layer which rises above an interface with the water, the froth layer including a concentrated amount of the primary organic substance which is then removed, and (ii) continuing to introduce said gas into the water until said organic substance present in the water is reduced to a level below a concentration of about 5.0 μg/L, wherein the organic substance comprises at least one of the group: perfluoro-octane sulfonate (PFOS); perfluoro-octanoic acid (PFOA); perfluoro-n-hexane sulfonic acid (PFHxS); perfluorononanoic acid (PFNA); perfluorodecanoic acid (PFDA/Ndfda); 6:2-fluorotelomer sulphonate compounds (6:2 FTS); 8:2-fluorotelomer sulphonate compounds (8:2 FTS); and perfluoro-octanoic acid (PFHpA).

In some embodiments, said organic substance present in the water is reduced to a level below a concentration of about 2.0 μg/L. In some more specific embodiments, said organic substance present in the water is reduced to a level below a concentration of about 1.0 μg/L.

In some embodiments, the steps of the method of the sixth aspect are otherwise as defined for the first aspect.

In a seventh aspect, there is provided a method of separating an amount of a primary organic substance from water which is contaminated initially with said primary organic substance and a secondary organic substance, by use of a method of aerated foam separation wherein the method comprises the steps of: (i) introducing a flow of gas into a vessel containing the water to produce a froth layer which rises above an interface with the water, the froth layer including a concentrated amount of the primary organic substance which is then removed, and also (ii) removing the secondary organic substance by either: (a) inclusion in the said froth layer, or (b) volatilisation into the atmosphere above the water and the froth phase, wherein the primary organic substance comprises at least one of the group: perfluoro-octane sulfonate (PFOS); perfluoro-octanoic acid (PFOA); perfluoro-n-hexane sulfonic acid, (PFHxS); perfluorononanoic acid (PFNA); perfluorodecanoic acid (PFDA/Ndfda); 6:2-fluorotelomer sulphonate compounds (6:2 FTS); 8:2-fluorotelomer sulphonate compounds (8:2 FTS); and perfluoro-octanoic acid (PFHpA); and wherein the secondary organic substance is at least one of the group comprising: Total Petroleum Hydrocarbons (TPH), including benzene, toluene, ethylbenzene and xylene (BTEX); Halogenated Volatile Organic Compounds, including 1,2-dichloroethane (DCE), 1,1-dichloroethane, trichloroacetic acid (TCA), tetrachloroethylene (PCE), and trichloroethylene (TCE); and Non-petroleum Hydrocarbons, including methanol and isopropyl ether.

In some embodiments, said primary organic substance present in the water is reduced to a level below a concentration of about 5.0 μg/L. In some more specific embodiments, said organic substance present in the water is reduced to a level below a concentration of about 2.0 μg/L. In some even more specific embodiments, said organic substance present in the water is reduced to a level below a concentration of about 1.0 μg/L.

In some embodiments, the steps of the method of the seventh aspect are otherwise as defined for the first aspect.

In an eighth aspect, there is provided a two-stage froth layer separation method for removal of an amount of a substance from water which is contaminated with the substance, the method comprising the steps of a first stage of:—admitting an initial amount of the water, which includes an initial concentration of the substance, into a first chamber via an inlet thereinto;—introducing a flow of gas into the first chamber, wherein said introduced gas induces a flow of water in the first chamber;—producing a froth layer which is formed at, and which rises above, an interface with the said flow of water and of introduced gas in the first chamber, the froth layer including an amount of water and also a concentrated amount of the substance when compared with its initial concentration;—removing at least some of the froth layer from an upper portion of the first chamber, and transferring said froth layer into a second chamber, such that either during or after said transfer step, the froth layer substantially collapses; whereupon when sufficient collapsed froth layer has been transferred into the second chamber, the method then comprises the steps of a second stage of:—introducing a flow of gas into the second chamber, wherein said introduced gas induces a flow of water in the second chamber;—producing a froth layer which is formed at, and which rises above, an interface with the said flow of water and of introduced gas in the second chamber, the froth layer including an amount of water and also a further concentrated amount of the substance when compared with its initial concentration in the second chamber;—removing at least some of the froth layer from an upper portion of the second chamber, and transferring said froth layer into a further vessel, prior to undergoing another treatment step.

In some embodiments, the substance comprises a perfluoroalkyl or polyfluoroalkyl substance (PFAS), such that the froth layer in the first chamber included an amount of water of less than about 10% of the initial amount of the water in said chamber, and the concentrated amount of PFAS was more than about 10 times its initial concentration in the water. In some embodiments, after producing the froth layer, the concentration of PFAS in the water which remains in the first chamber was less than about 5 μg/L.

In some further embodiments, the froth layer in the first chamber included an amount of water of less than about 5% of the initial amount of the water in said chamber, and the concentrated amount of PFAS was more than about 20 times its initial concentration in the water. In some embodiments, after producing the froth layer, the concentration of PFAS in the water which remains in the first chamber was less than about 1 μg/L.

In some embodiments, the froth layer produced in the second chamber included an amount of water of less than about 5% of the initial amount of the water in said second chamber, and the concentrated amount of PFAS was more than about 20 times its initial concentration in the water in said second chamber. In some embodiments, after producing the froth layer, the concentration of PFAS in the water which remains in the second chamber was less than about 4 μg/L.

In some further embodiments, the froth layer in the second chamber included an amount of water of less than about 3% of the initial amount of the water in said second chamber, and the concentrated amount of PFAS was more than about 35 times its initial concentration in the water in the second chamber. In some embodiments, after producing the froth layer the concentration of PFAS in the water which remains in the first chamber was less than about 2 μg/L.

In a yet further aspect there is provided a method of separating an amount of a substance from water which is contaminated with the substance, the method comprising the steps of: (i) admitting said contaminated water into a chamber via an inlet thereinto; (ii) introducing a flow of gas into a lowermost region of the chamber, wherein the introduced gas induces an upward flow of water in the chamber, and produces a froth layer which rises above an interface with the water in an upper portion of the chamber, the froth layer including a concentrated amount of the substance; and (iii) maintaining the depth of the froth layer above the interface using a froth depth regulation device which is moveably positionable in response to movement of the location of the interface; such that the water content of the froth layer near the uppermost region of the chamber is controlled, to influence the concentration of the substance therein.

In some embodiments, the upward flow of gas and the production of the froth layer is continuous. The operation can also be conducted in batch mode for specific treatment situations.

In some embodiments, the step of controlling the water content of the froth layer in the upper region of the chamber is by at least one of the group comprising: controlling a physical parameter of the flow of introduced gas; and controlling a physical parameter of the froth layer.

In some embodiments, the step of controlling a physical parameter of the flow of introduced gas comprises use of a flow controller and an inlet valve for controlling the flow of said introduced gas into the chamber.

In some embodiments, the step of controlling a physical parameter of the flow of introduced gas comprises use of a bubble generation device located prior to, or at the point, when said introduced gas enters the water located in the chamber.

In some embodiments, the froth depth regulation device is selected from the group comprising: a device which is moveable within the chamber in response to movement of the location of the interface; and a device which is arranged at a fixed location within the chamber, and the location of the interface is responsive to the flow of the introduced gas.

In some embodiments, the step of controlling a physical parameter of the froth layer further comprises use of a device for confining the cross-sectional flow path of the froth in the uppermost region of the chamber, resulting in drainage of said froth layer.

In some embodiments, the method further comprises the step of removal of at least some of the froth layer from the upper region of the chamber. In one form of this, the froth layer is collapsed during said removal step from the upper region of the chamber, and prior to undergoing a secondary treatment step. In some specific examples, the froth layer is collapsed by using mechanical apparatus from the group comprising: a foam breaker, a vacuum extraction device, and a froth extraction head.

In some embodiments of the method, the secondary treatment step for treating the collapsed froth layer, including the concentrated substance, uses at least one of the processes of the group comprising: absorption (using activated carbon, clay, or ion exchange resins), filtration (using reverse osmosis membranes); and introduction of further quantity of gas into a separate containment apparatus to produce another froth layer comprising a further concentrated amount of the substance.

In some embodiments of the method, the substance is organic. In one form, the organic substance is at least one of a perfluoroalkyl or polyfluoroalkyl substance (PFAS). In other particular forms of this, the perfluoroalkyl or polyfluoroalkyl substance includes one or more of the group comprising: perfluorooctane sulfonate (PFOS); perfluorooctanoic acid (PFOA); perfluorohexane sulfonate (PFHxS); poly fluorinated carboxylic acids, alkyl sulfonates and alkyl sulfonamido compounds; and fluorotelemeric compounds, each having differing carbon chain lengths; and including precursors of these.

In a yet further aspect, there is provided an apparatus for separating an amount of a substance from water which is contaminated with the substance, the apparatus comprising: (i) a chamber having an inlet which is arranged in use to admit contaminated water thereinto; (ii) a gas introduction device located in a lowermost region of the chamber which in use admits gas into the chamber, the introduced gas for inducing water to circulate from a region near the lowermost region toward an uppermost region of the chamber, and for producing a froth layer which rises above an interface with the water, a layer which includes a concentrated amount of the substance; and (iii) a froth depth regulation device which is moveably positionable in response to movement of the location of the interface, in use to maintain the depth of the froth layer above the interface, wherein the apparatus is arranged in use to contain the froth layer near the uppermost region of the chamber and to control the water content of the froth layer, to influence the concentration of the substance therein In some embodiments, the inlet is arranged in use for admission of the water to the chamber at the uppermost region thereof.

In some embodiments, an outlet is arranged in use for egress of water from the chamber at the lowermost region thereof, thereby setting up a flow of water in the chamber which is countercurrent to the rising air flow.

In some embodiments, the said outlet is in fluid communication with an inlet of a further chamber, said inlet being located at a respective uppermost region thereof.

In some embodiments, the chamber comprises an elongate cylindrical vessel.

In some embodiments, the flow of introduced gas into the chamber is controlled by a flow controller and an inlet valve on a gas delivery line, responsive to a measurement of one of the group comprising: water content of the froth layer; froth stability of the froth layer; location of the interface in the chamber.

In some embodiments, a bubble generation device is located prior to or at the point when the flow of introduced gas enters the water located in the chamber.

In some embodiments, the froth depth regulation device is selected from the group comprising: a device which is moveable within the chamber in response to movement of the location of the interface; and a device which is arranged at a fixed location within the chamber, and the location of the interface is responsive to the flow of the introduced gas.

In some embodiments, the froth depth regulation device is arranged for confining the cross-sectional flow path of the froth in the chamber, resulting in froth confinement and drainage of said froth layer. Apparatus which is shaped to confine or squeeze a rising froth layer can cause additional drainage of the froth layer, and may include changes to the cross-sectional open area of froth flow, for example by the use of froth crowders, narrow necked passages or channels or capillaries, tapered funnels, weir skimmers, for example.

In some embodiments, the apparatus further comprises a froth layer removal device in which at least some of the froth layer is collapsed during removal of at least some of the froth layer from the uppermost region of the chamber, and prior to a secondary treatment step. In one form, the froth layer collapse device includes mechanical apparatus from the group comprising: a foam breaker, a vacuum extraction device, and a froth extraction head.

In some embodiments, the apparatus further comprises a secondary treatment device in use for treating the collapsed froth layer for removal of the concentrated substance, wherein the treatment device includes at least one of the group comprising: absorption (using activated carbon, clay, or ion exchange resins), filtration (using reverse osmosis membranes); and introduction of further quantity of gas into a separate containment apparatus to produce another froth layer comprising a further concentrated amount of the substance.

Other aspects, features, and advantages will become further apparent from the following detailed description when read in conjunction with the accompanying drawings which form a part of this disclosure and which illustrate, by way of example, principles of the inventions disclosed.

DESCRIPTION OF THE FIGURES

The accompanying drawings facilitate an understanding of embodiments of the apparatus, system and method of the disclosure.

FIG. 2 shows a schematic side, sectional, elevation view of an apparatus for separating an amount of a substance from water which is contaminated with the substance, the apparatus including a froth depth regulating device located in a chamber, the device being moveable within the chamber, in accordance with a further embodiment of the present disclosure;

FIG. 2A shows a schematic side, sectional, elevation view of component parts of the froth depth regulating device and of the chamber of FIG. 2 when in use;

FIG. 2B shows a cross-sectional, plan view of the assembly of component parts of the froth depth regulating device and of the chamber of FIG. 2, when viewed at the cross-sectional plane X-X;

FIG. 7 shows a schematic perspective view of a foam flotation separation apparatus for removal of a substance from water which is contaminated with the substance, the apparatus showing the vessel shape and air inlet system, in accordance with an embodiment of the present disclosure;

FIG. 8 shows a schematic perspective and sectional view of the foam flotation separation apparatus for removal of a substance from water of FIG. 7, the sectional view showing details of the air inlet pipes which are fitted with a venturi to create bubbles, the pipe ends located in the interior of the chamber;

FIG. 8A shows a side elevational and sectional view of the foam flotation separation apparatus for removal of a substance from water of FIG. 8;

FIG. 8B shows a detail view of part of the exterior side of the foam flotation separation apparatus for removal of a substance from water of FIGS. 8 and 8A;

DETAILED DESCRIPTION

This disclosure relates to the features of a flotation cell 10 and its use for removal of an organic contaminant from a water supply which is pumped into that cell 10. Typically, such contaminated water has been obtained by extraction pumping from a nearby aquifer or water storage which has a certain level of organic contaminant(s) which have become dissolved or dispersed therein. A small amount of suspended solids may also be present, so that the water may have some turbidity.

Figure 1:
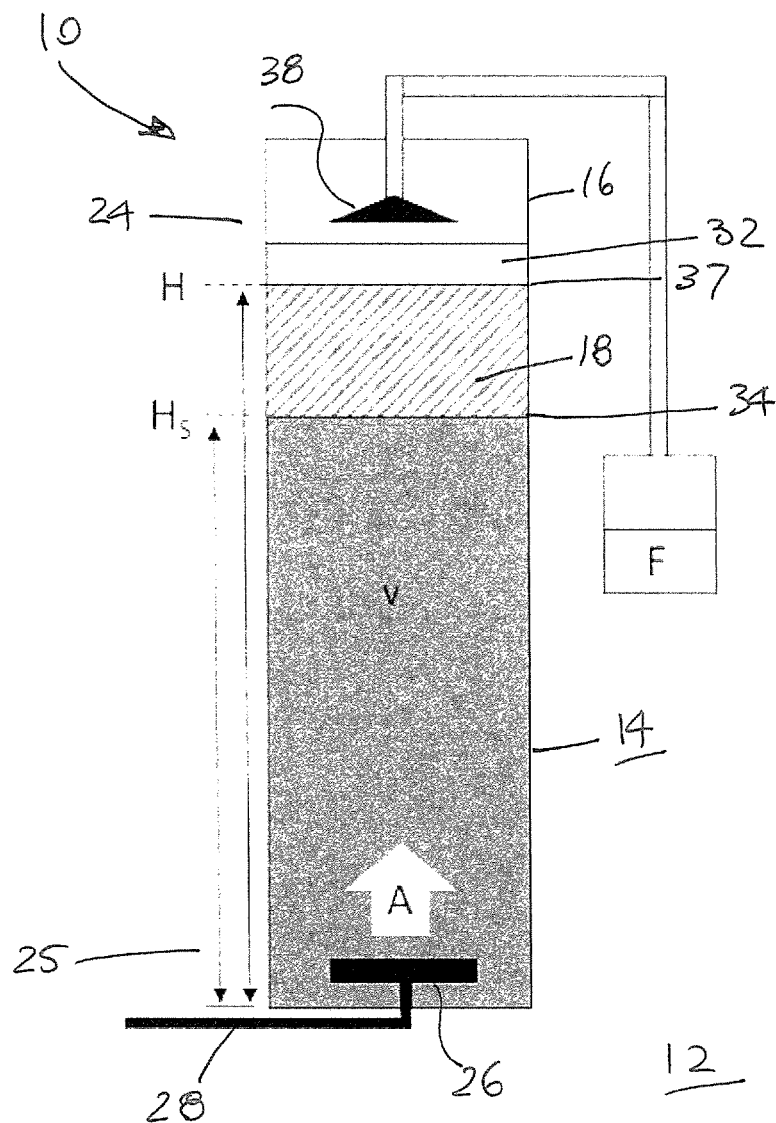
FIG. 1 shows a schematic side, sectional, elevation view of an apparatus for separating an amount of a substance from water which is contaminated with the substance, the apparatus including a froth depth regulating device located in a chamber, the device being moveable within the chamber, in accordance with one embodiment of the present disclosure.

Referring to the embodiment shown in FIG. 1, the flotation cell 10 is in the form of an elongate, cylindrical column 16 having an interior chamber 18. The column 16 is circular in cross-section, and is positioned to stand vertically upright on surrounding ground 12. The column 16 can be a tube or a plurality of casing elements 14 which is made of hard plastic or metal, to be sufficient to withstand the hydraulic pressure of the depths of water it is to contain, and not collapse or corrode.

The chamber interior chamber 18 has an inlet which is arranged to admit water feed material into the chamber 18 nearer toward the uppermost in use end 24 of the flotation cell 10. In the embodiments shown in FIGS. 2 and 3, the inlet is in the form of a hole 22, arranged in the outer casing wall of the column 16, and into which a conduit 21 is located, and oriented orthogonally to the elongate axis of the column 16. In use, the conduit(s) 21 convey a flow of liquid which is pumped therethrough from a source holding tank (or other type of reservoir), into the chamber 18, and this can be done on a continuous or intermittent basis depending on whether the flotation cell 10 is being operated in a continuous flow or batch mode.

In other embodiments, for example as shown in FIGS. 2A and 2B, the feed water supply line can be a pipe 21A that is positioned to extend from above the column 16, and arranged to access the chamber 18 at or near the uppermost end 24 of the column 16. In that example, the pipe 21A is joined to the interior wall of the column 16 by means of brackets or similar mountings.

In FIG. 1 the chamber 18 also has a gas introduction device in the form of a sparger 26 or bubbler (typically made of a sintered metal or from a ceramic material) which is located in the chamber 18 near the lowermost in use end 25. The sparger 26 is positioned at around the centreline axis of the column 16, and is connected to a gas supply line 28 which can be a pipe which is used to charge gas into the chamber 18 via the sparger 26, the gas typically caused to flow by means of a pump or some other source of compressed or pressurised gas which is located nearby (not shown). The sparger 26 is located at a height close to the bottom end of the chamber 18 to discourage settling of particulate material in that end of the chamber 18.

During use, gas is charged into the chamber 18 at a pressure and flow rate that causes bubbles to form at the sparger 26 and then, due to buoyancy, rise upward along the length of the chamber 18. Typically, the gas used is compressed air, but other gases can be used depending on the site requirements. For example, to oxygenate the water, the gas introduced could be oxygen and/or ozone, perhaps mixed with air. In another way to introduce a gas, a bubble generation device may be fitted onto a pipe through which a portion of the water in the chamber 18 is recirculated by pumping. The bubble generation device may be some sort of in-line gas induction device, such as a venturi restrictor, into which gas is drawn into the moving liquid flow by induction, and then the flow passage is immediately expanded, thereby causing bubbles to be formed.

Whichever way it is achieved, once the gas bubbles are formed they will rise in the chamber 18 and mix with the water which has flowed into the chamber 18 via the conduit 21, and filled the chamber 18. The bubbles will rise toward the uppermost end 24 of the chamber 18 within the column 16, and during this residence time have had plenty of opportunity to interact with the water, and for the bubbles to come into contact with organic contaminant(s) present. The chamber 18 is arranged so that such mixing is a countercurrent due to the rising flow of air bubbles meeting the downward flow of water in the chamber 18.

At the upper end 24 of the chamber 18, the interaction of the bubbles and the organic contaminant in the water, results in the formation of a froth layer 32, which develops immediately above an interface located at the raised dynamic water level 37 (DWL, or H) of water which is located within the chamber 18. The static water level 34 (or Hs) rises to the dynamic water level 37 (or H) once the flow of air is added during the treatment process. The dynamic water level 37 can be controlled by various means, including by the design of the chamber and outlet, however the primary control is undertaken by variations in the inlet gas delivery rate, or water inflow and outflow rates. In one example, the inlet gas delivery rate can be regulated using information from a water level interface sensor which is located within the chamber 18, where signals from such a level sensor can be sent to a control system connected to an adjustable valve on the gas delivery line, or water inflow and outflow rates.

Figure 3A:
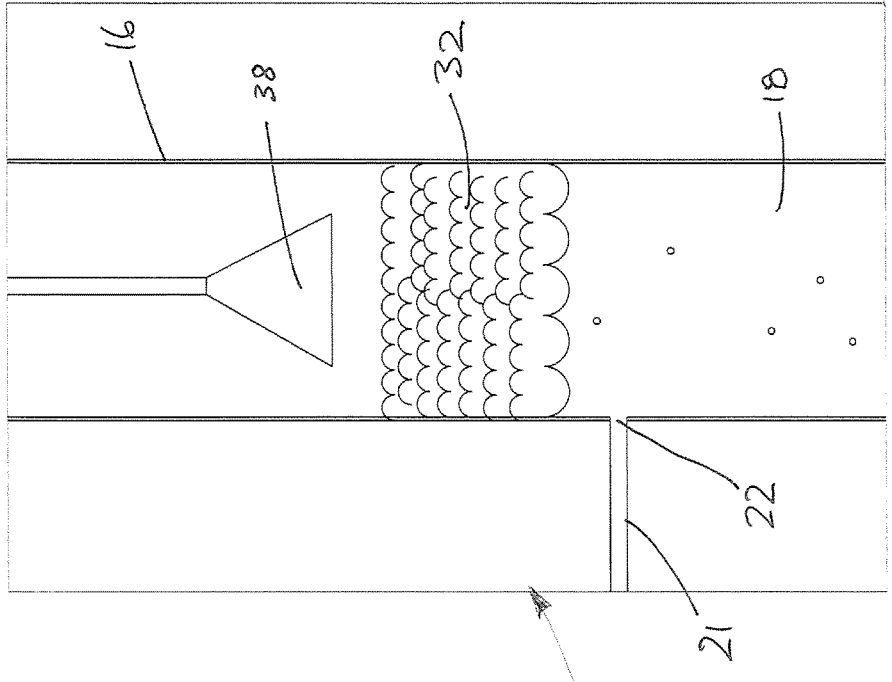
FIG. 3A shows a schematic side, sectional, elevation view of component parts of the froth depth regulating device and of the chamber of FIG. 2 when in use.
Figure 3:
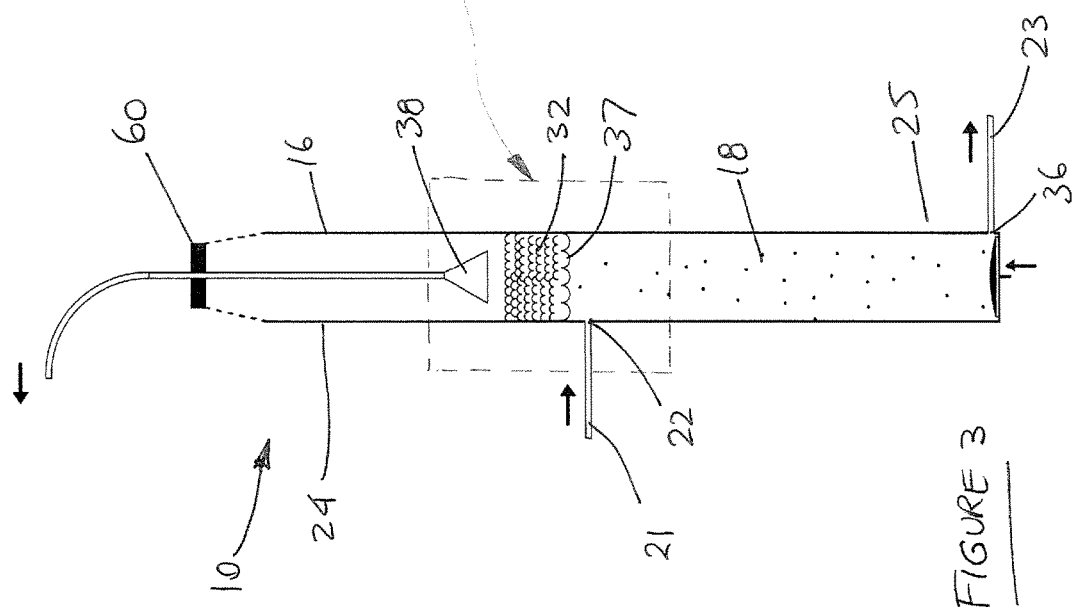
FIG. 3 shows a schematic side, sectional, elevation view of an apparatus for separating an amount of a substance from water which is contaminated with the substance, the apparatus including a froth depth regulating device located in a chamber, the device being moveable within the chamber, in accordance with a further embodiment of the present disclosure.
Figure 4:
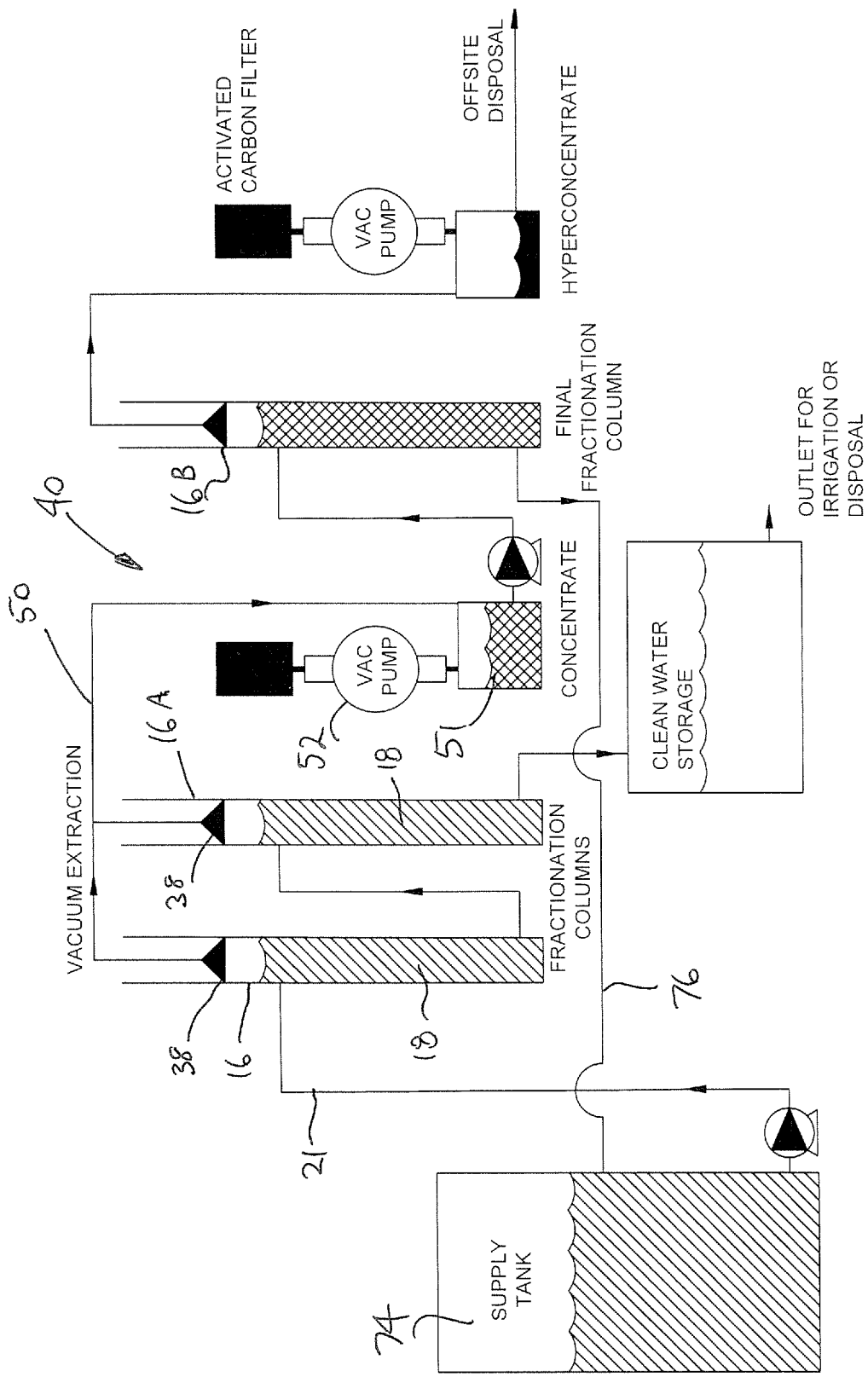
FIG. 4 shows a schematic side, sectional, elevation view of a system for separating an amount of a substance from water which is contaminated with the substance, the apparatus including multiple chambers arranged in series and in fluid communication with an adjacent chamber, each respective chamber having a froth depth regulating device located therein, each device being moveable within each said chamber, in accordance with a further embodiment of the present disclosure.

In FIGS. 2, 3 and 4, the chamber outlet is arranged to allow water to egress from the chamber 18 nearer toward the lowermost in use end 25 of the flotation cell 10. In the embodiments shown in those Figures, the chamber outlet is in the form of a hole 36, arranged in the outer casing wall of the column 16, and into which a conduit 23 is located, and oriented orthogonally to the elongate axis of the column 16. The conduit 23 is arranged to permit the flow of liquid therethrough in use.

The froth layer 32 formed above interface with the dynamic water level 37 in the chamber 18 will rise up inside the column 16 and further into the uppermost end 24 thereof. The wettest portion of the froth layer 32 is closest to the interface which forms at the upper surface of the dynamic water level 37 of water in the chamber 18, and it progressively drains and becomes drier as the froth layer 32 rises further above the interface within the column 16. Surface active material carried into the froth layer 32 includes the organic contaminant. In this way, the contaminant becomes much more concentrated in the froth layer 32 compared with its initial concentration in the feed water. The froth phase is also of considerably less volume to deal with for secondary processing, compared with the volume of feed water.

Once the drained froth layer 32 rises up into the upper end 30 of the column 16, a froth removal device is used to remove the froth layer 32 from the chamber 18. In the embodiment shown in FIG. 1, a froth removal device in the form of a suspended conical vacuum suction hood 38 is lowered to, and positioned at, an optimal distance above the dynamic water level 37 interface with the froth layer 32 in the well 14. Reference should now also be made to the embodiment of the chamber shown in FIG. 3 (and to the detailed drawings of this well configuration shown in FIG. 3A) which also uses a system with a suspended conical vacuum suction hood. (In FIG. 3 like functional parts to those shown in FIG. 1 are given like part numbers).

In FIG. 1, and in FIG. 3, the froth rises up through the conical concentration hood 38 and exits through an open outlet at the top (or apex) of the hood 38. The froth, which is now drier as a result of becoming drained by being confined by the tapering flow passage within the hood 38, then moves on to further treatment.

In the example shown in FIG. 4, the suction hood 38 is used to collapse the foamy froth concentrate and cause it to flow upward via a vacuum line 50 and into a liquid concentrate receiving container 51 as part of the pipe assembly 40 connected to a vacuum system operated by a pump 52. This system allows the collapsed froth to be further processed. The vacuum suction in the hood 38 is set to a minimum level sufficient to cause collapse of the drained froth layer 32 into a liquid form. Experiments have shown that the location of the vacuum suction hood 38 (acting as a froth depth regulation device) controls the amount of water in the froth layer 32, which therefore influences the concentration of the contaminant substance achieved in the froth layer 32.

In a further example of how to optimise the operation of the system, the inlet gas delivery rate into the chamber 18 can be regulated using information from a conductivity meter, or a water level sensor, which can be located at or below the vacuum suction hood 38, for example on an interior wall of the chamber 18. Signals from the water level sensor can provide information about the water content of the froth layer 32, and can be sent to a control system connected to an adjustable valve on the gas delivery line. In such an example, if the froth layer 32 is insufficiently dry, the flow of introduced gas into the chamber may need to be decreased, because there is too much water being moved in the froth layer 32 and the process is not concentrating the contaminant sufficiently. Conversely if there is little or no production of froth, the flow of introduced gas into the chamber 18 may need to be increased.

In instances where the vacuum suction hood is arranged at a fixed location within the chamber 18, it is the location of the interface at the dynamic water level 37 which is responsive to changes in the flow of the introduced gas, and/or the water inflow and outflow rates.

In the example shown in FIG. 3, where the vacuum suction hood is not at a fixed vertical position in relation to the column, the aforementioned level sensors can inform a vertical positioning system 60 for the vacuum suction hood 38 to move it in an axial direction inside the column 16 to reach an appropriate position in relation to the interface at the dynamic water level 37. The positioning system may be a motor drive or some sort of mechanically actuated pulley system to adjust the height of the suction hood 38.

In the example shown in FIG. 2, the froth depth regulation device includes both the suction hood 38 and a movement guidance system in the form of a frame 62 which is attached to the suction hood 38 and is also fitted with one or more buoy floats 64 at its lowermost end which in use will cause the frame to float on the water in the chamber 18. These floats 64 mean that the frame 62 will always float at whatever is the vertical height of the interface 37 of water being treated in the column 16, and thus provides a fixed, optimal distance between the lower-facing, open mouth end 66 of the vacuum suction hood 38 and the interface 37.

In this embodiment, no matter what the dynamic water level 37 may be in the chamber, the suction hood 38 can maintain its vertical position relative to that froth layer interface without the need for a sensor and level control system, or operator intervention. No discrete step of raising or lowering of the hood within the chamber 18 is required to move the vertical position of the hood 38 in relation to the froth interface 37 (as is the case for the embodiment 38 of FIG. 3), and no changing of the gas flow rate is required to move the vertical position of the froth interface 37 in relation to a vacuum hood 38 (as is the case for the embodiment of FIG. 1 with a fixed vertical position suction hood in the chamber 18).

The movement guidance system for the suction hood 38 shown in FIG. 2 includes three vertically axially aligned and elongate T-bar shaped tracks 70 which are fitted to the interior wall of the chamber 18. Respective groove portions 68 of the frame are arranged to receive a respective one of these T-bar tracks, and to slide freely therealong in a tongue in groove style arrangement. In turn the suction hood 38 is operatively connected to said frame by means of the exit conduit 72.

In various experimental work with this system, for fluids containing high concentrations (>1000 ug/L) of PFAS surfactants, the foam density and water content is elevated and it is necessary for the extraction hood to be raised to heights sometimes exceeding 0.5 m above the dynamic water level. For lower concentrations, the hood can be lowered to less than 0.1 m.

In operation, the flotation cell 10 can be used to remove a substance such as an organic contaminant from the water being treated. The present disclosure is mainly concerned with the removal of an organic substance known generally as a perfluoroalkyl substance or a polyfluoroalkyl substance (PFAS). This can include one or more of the group comprising: perfluorooctane sulfonate (PFOS); perfluorooctanoic acid (PFOA); perfluoro-n-hexane sulfonic acid, (PFHxS); poly fluorinated carboxylic acids, alkyl sulfonates and alkyl sulfonamido compounds; and fluorotelemeric compounds, each having differing carbon chain lengths; and including precursors of these. The main substances of interest from this group are PFOS, PFHxS and PFOA which can persist in water for a long time.

As gas is charged into the chamber 18 and bubbles form at the sparger 26, the bubbles rise upward over length of the chamber 18 and accumulate in the froth layer 32 located above the interface which forms at the upper surface of the dynamic water level 37.

When the collapsed froth concentrate containing the organic contaminant(s) has been discharged into a separate liquid concentrate receiving container, or knock-out vessel, it is then passed for secondary treatment involving either further concentration, destruction or removal of the contaminant.

In one option for secondary treatment, a final concentrate liquid is treated for removal of the concentrated organic contaminant(s), for example by absorption onto solid or semi-solid substrates (using activated carbon, clay, ion exchange resins or other organic materials), or by filtration (using reverse osmosis membranes to filter and increase the concentration of contaminant(s) and reduce treatment volumes). Once the absorption capacity of a substrate is exceeded it can then be regenerated or destroyed.

Another option for secondary treatment is the further concentration of the collapsed froth may be undertaken using a similar process to that used for the initial separation step and may be conducted in above ground treatment apparatus where the collapsed froth is subject to further gas sparging and froth concentration. Multiple concentration steps may be undertaken using this approach to minimise the volume of fluids requiring treatment. Residual fluids produced during the concentration steps may be re-introduced to the start of the process or, where appropriate, released to a liquid waste disposal/treatment system or to the environment. This will now be described in more detail with reference to the system shown in FIG. 4.

FIG. 4 illustrates a series of foam fractionation columns 16, to support rapid foam generation via aeration of the water that is being treated in the columns 16. The system shown can operate using continuous flow or as a batch process depending on the concentration and nature of PFAS contaminants and co-contaminants.

In a continuous flow application, air is introduced to the base of each column 16 through a diffuser/sparger and contaminated water is introduced near the uppermost end of each water column, leaving continuously via an outlet in the base below the diffuser/sparger. Using this approach a counter current system is established within the column enabling maximum contact between air bubbles and impacted water whilst allowing a continuous processing rate to be achieved.

In a batch application the column is filled to a predetermined level and this batch is treated within the confines of the column for a fixed period before it is released to the next stage of the fractionation process. Typically this approach is used where longer retention times are required.

The diffuser/sparger is designed to create a tailored spectrum of optimally sized bubbles, which rise up through the water within the column 16. The dense bubble stream which is produced, and the high interfacial surface area of the bubbles provides both sufficient mixing agitation as well as a strong attraction for PFAS which may be present in solution in the feed water. The PEAS molecules are quickly scavenged from the water and drawn to the top of the water column. The foam formed at the top of water column is highly enriched in PFAS and by using the vacuum extraction head, the foam can be crowded and drained. Before the foam has a chance to collapse and dissolve back into the water, it is harvested by the vacuum extraction head and drawn into a centralised collection tank.

By establishing appropriate flow rates (and therefore detention times), the water travelling through the column (now depleted in PFAS) is discharged through the outlet conduti near the column base and then into a secondary fractionation column for further treatment. Fractionated residual water flowing from the secondary treatment column is directed to a temporary holding tank and, only after further assessment and confirmation of compliance with regulatory guidelines, are they redirected back to a liquid waste disposal/treatment system or released to the environment.

PFAS concentrate/foam drawn from the primary 16 and secondary 16A fractionation columns is temporarily stored in a "knock-out" vessel 51. This material is then further processed in a third fractionation column 16B especially designed for concentrates to create a hyperconcentrate. Hyperconcentrate/foam removed from the the third fractionation column 16B is directed for storage and then finally for offsite destruction. Treated water flowing in conduit 76 from the base of the concentrate fractionation column 16B is returned to the primary feed tank 74 for reprocessing or where appropriate redirected to a liquid waste disposal/ treatment system or released to the environment. Vacuum exhaust air from all fractionation columns are directed through absorptive filters prior to release to atmosphere.

EXPERIMENTAL RESULTS

Experimental results have been produced by the inventors using both laboratory (batch) and a pilot-scale (continuous) configuration of the new apparatus and method disclosed herein, to observe any beneficial outcomes during the operation of the process of concentrating PFAS from groundwater samples.

(1) The inventors have discovered that certain specific PFAS can be treated by this technique

| Successfully Removed by Foam Fractionation (to either below drinking water criteria or below level of reporting) | | |
|---|---|---|
| Compound Name | Abbreviation | Level of Concern (Priority/Secondary/Other) |
| Perfluorohexane sulfonic acid | PFHxS | Priority |
| Perfluorooctane sulfonic acid | PFOS | Priority |
| Perfluorooctanoic acid | PFOA | Secondary |
| Perfluorononanoic Acid | PFNA | Other |
| Perfluorodecanoic Acid | PFDA/Ndfda | Other |
| 6:2 Fluorotelomer Sulfonate | 6:2 FTS | Other |
| 8:2 Fluorotelomer Sulfonate | 8:2 FTS | Other |
| Moderately Reduced by Foam Fractionation | | |
| Perfluoroheptanoic Acid | PFHpA | Other |
| Little effect by Foam Fractionation | | |
| Perfluorohexanoic acid | PFHxA | Secondary |
| perfluorobutane sulfonic acid | PFBS | Secondary |
| perfluoropentane sulfonic acid | PFPeS | Secondary |

Both of the key priority PFAS compounds of concern (PFOS and PHFxS) can be successfully removed by Foam Fractionation (FF). FF was also found to be similarly effective in physically removing PFOA (a secondary priority compound) and four other routinely analysed PFAS compounds. Perfluoroheptanoic Acid (PFHPA) was moderately reduced by FF. The three other secondary priority compounds (PFHxA, PFBS and PFPeS) were shown to be minimally, or not affected by FF, and thus can be separated from the primary priority compounds using the foam separation which has been developed.

In summary, FF is ideally suited to physically removing the priority PFAS molecules (including other theoretical non-PFAS co-contaminates) allowing more sophisticated (and expensive) techniques to be reserved as polishing treatments to achieve concentrations below criteria for regulated disposal or discharge.

(2) The inventors have discovered the concentration range of different PFAS substances in water that can be effectively treated It has been demonstrated that the physical separation technique described herein can be used to treat water and concentrates impacted by PFAS ranging in concentration from as little as 0.05 μg/L to as high as 50,000 μg/L.

(3) The inventors have discovered that other contaminants be treated with this system The physical separation technique described herein is designed to optimise the creation of a contaminant rich extractable foam within a fractionation column. Co-contaminants effectively treatable by this same process include:

Total Petroleum Hydrocarbons (TPH), including benzene, toluene, ethylbenzene and xylene (BTEX);

Halogenated Volatile Organic Compounds, including 1,2-dichloroethane (DCE), 1,1-dichloroethane, trichloroacetic acid (TCA), tetrachloroethylene (PCE), and trichloroethylene (TCE)

Non-petroleum Hydrocarbons (methanol and isopropyl ether)

Other contaminants which will also be reduced include: Acetone, PAHs (naphthalene, and 2- and 3-ring PAHs), MTBE, MIBK, MEK. The specifics of co-contaminant reduction using the FF are undergoing lab/field trial evaluations.

(4) The inventors have measured how effective this system is for treating PFAS

Figure 13:
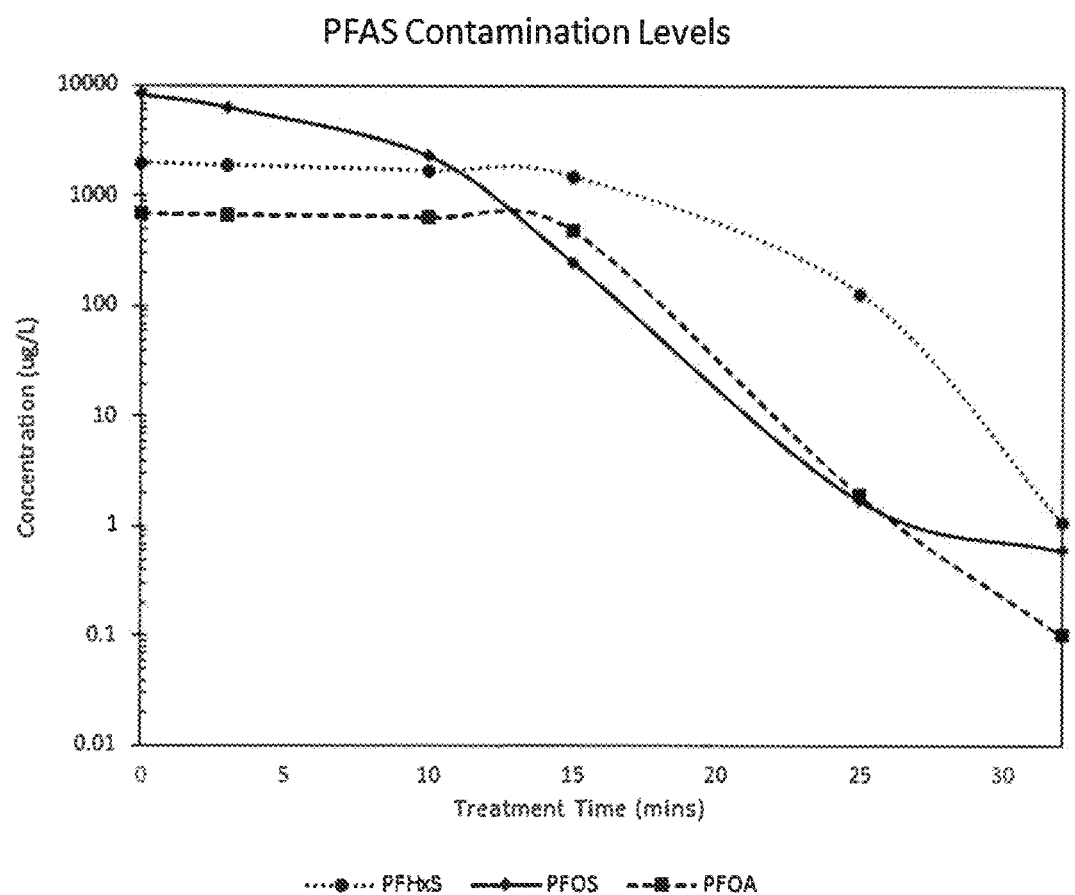
FIG. 13 is a graph illustrating the start and end concentrations of priority PFAS compounds in experimental treatments.

The inventors collected 960 L of impacted groundwater from Site 1 and 40 L of water stored in an above-ground tank located at Site 2. These waters were eventually combined in one IBC and approximately 550 L of the resulting mix was put through a fractionation column to create a concentrate. This concentrate was then put through a secondary fractionation column to create a hyper-concentrate. The start and end concentrations of fractionate are shown in the table below and in the graph of FIG. 13:

| Treatment Time | PFAS Concentration (ug/L) | | |
|---|---|---|---|
| (min) | PFHxS | PFOS | PFOA |
| 0 | 2000 | 8400 | 700 |
| 3 | 1900 | 6400 | 680 |
| 10 | 1700 | 2300 | 640 |
| 15 | 1500 | 250 | 480 |
| 25 | 130 | 1.7 | 1.9 |
| 32 | 1.1 | 0.6 | 0.1 |

Priority PFAS Compound Removal: The study data shows that the priority compounds can be treated to near or below recreational guidelines from highly contaminated source concentrates. Drinking water targets of 0.07 ug/L will be achievable by extending detention times within the column or by redirecting fluids through an alternative "polishing" process.

Overall Volume Reduction: By using a second fractionator for treating concentrate, OPEC was able to create a waste stream (hyper-concentrate) with a volume ×400 less than the original water.

Footprint and Energy Requirement

The estimated footprint of and energy consumption for three different sized treatment systems are presented in the table below:

| System Size | Energy Consumption | Footprint | Transport Method |
|---|---|---|---|
| 500 L/hr | 4 kW | 3.5 m2 | Skid Mounted |
| 2000 L/hr | 12 kW | 8.0 m2 | Skid Mounted |
| 5000 L/hr | 21.5 kW | 14.4 m2 | 20 ft Container |

| Hs 1213 | | | | | | | | |
|---|---|---|---|---|---|---|---|---|
| Run Time | A = Airflow Rate (L/min) | H = Water Column (mm) | F = Concentrate Vol (ml) | Sample ID | PFHxS | PFOS | PFOA | Observations |
| 0 | 0.5 | 1250 | | 08-01 | 2000 | 8400 | 700 | |
| 3 | 0.5 | 1150 | | 08-02 | 1900 | 6400 | 680 | Suction head set at 1635 mm |
| 5 | 1 | | | — | | | | Strong foam head |
| 10 | 1.5 | 1070 | | 08-03 | 1700 | 2300 | 640 | |

-continued

Hs 1213

| Run Time | A = Airflow Rate (L/min) | H = Water Column (mm) | F = Concentrate Vol (ml) | Sample ID | PFHxS | PFOS | PFOA | Observations |
|---|---|---|---|---|---|---|---|---|
| 15 | 2.5 | | | 08-04 | 1500 | 250 | 480 | Foam head weakening, increasing air flow rate |
| 18 | 3.5 | | | | | | | Foam head still weakening, can run more air |
| 20 | 4 | | | | | | | |
| 22 | 4 | | | | | | | Suction head lowered to 1330 mm, Hd = 1070 mm |
| 24 | 4 | | | | | | | Suction Head lowered to 1200 |
| 25 | 4 | | | 08-05 | 130 | 1.7 | 1.9 | |
| 26 | 4 | | | | | | | Suction head lowered to 1100, Hd = 970 mm |
| 32 | 4 | | 250 | 08-06 | 1.1 | 0.58 | 0.1 | Experiment Stopped after 32 minutes, no visible foaming |
| | | | | 08-07 | 8600 | 47000 | 4200 | Hyperconcentrate Sampled |
| | 2.6AVG (L/min) | | 0.25 Total (L) | | 99.95% Removal | 99.99% Removal | 99.99% Removal | |

From the above, it will be understood that at least some embodiments of apparatus and method in accordance with the present inventions provide one or more of the following advantages, in comparison to conventional treatment methods:

A lower volume of PFAS concentrated liquor is produced for secondary treatment steps;
A smaller secondary treatment plant is required;
A lower overall treatment time is achieved compared to standard "pump and treat" systems;
A smaller volume of concentrated liquor means that use of a complete destruction process (not disposal to landfill) is feasible;
Has the ability to extract contaminant from water pumped out of contaminated ground instead of performing in-situ chemical treatment, which may not work (or be reversible), and may not reach all levels of groundwater contamination.

The apparatus can be configured for use in many different types of remediation situations, including source zones, hotspots, migration pathways—it is possible to adjust a few simple variables such as vacuum suction, distance from the suction apparatus to liquid-froth interface, and the flotation airflow rate, and deal with any concentration of contaminant.

The system can be expanded easily to meet specific site requirements as the fractionation columns, pumps, vacuum systems, pipework and connections are comprised of standard componentry, expansion is simply a matter of replicating systems in parallel, and pump and blower sizes may be adjusted (up or down) to meet the changed requirements.

A physical separation process external to the ground avoids the use of potentially hazardous chemicals as part of in-situ chemical treatment approaches, and produces no by-products or wastes.

Depending on the start concentrations, vacuum extraction experiments have created concentrates between 1/10 to 1/45 of the original fluid volume and a residual process water essentially devoid of PFAS.

Subsequent re-fractionation of concentrates (and amalgamation of clean process waters) creates hyper-concentrates that bring overall reduction ratios to approx. 1/400 of original fluid volume.

The vacuum extraction approach also allows for the following performance improvements:
The PFAS foam breaks during the extraction process and creates a fluid with few bubbles.
The height of extraction hood can easily be adjusted to minimise extraction of "wet" foam, giving too much carryover water and dilution.
The suction hood transports the resulting PFAS rich liquid concentrate out from the fractionation vessel, which unlike conventional particle flotation or other foam fractionation is not directly transporting a volumetric flow out of the primary vessel.

PILOT PLANT DESIGN DETAILS

The inventors were engaged to design, supply, construct, commission and operate a water treatment plant (WTP) for the removal of PFAS from impacted groundwater at an aviation base site.

The scope of works of this project involves the extraction of groundwater that has been affected by PFAS, treatment of the water on site, testing of the water to qualify PFAS removal and reinjection/disbursal back to the ground. Extraction wells and reinjection wells/disbursal equipment was not included in the scope of work, however, supply, installation and management of the groundwater well pumps, pump power and pump control are part of the process.

Main Features of the Works Included:
Design, development, fabrication and pre-commissioning of a Water Treatment Plant (WTP) off site.
Earthworks, civil and construction of a laydown area for the WTP, including access roads, bunding and perimeter fencing.
Supply, installation and commissioning of up to 20 groundwater well pumps in various locations.
Delivery to site, assembly, construction and commissioning of WTP.

The climatic conditions used for the project are based on weather data from the Bureau of Meteorology. Temperature and rainfall statistics are taken from the nearest weather stations to the site.

TABLE 1

General Site conditions

| Condition | Value | Units |
|---|---|---|
| Highest Maximum Temperature | 42.8 | 0° C. |
| Lowest Minimum Temperature | −7.5 | 0° C. |
| Mean Maximum Temperature | 31.0 | 0° C. |
| Mean Minimum Temperature | 2.9 | 0° C. |
| Highest Recorded Daily Rainfall | 130.0 | mm |
| Maximum Wind Gust Speed | 161 | km/h |
| Mean Wind Speed | 18.6 | km/h |

The basis of design for the WTP is identified in Table 2 below:—

TABLE 2

Design Parameters

| Condition | Value | Units |
|---|---|---|
| Groundwater Treatment Volume (contractual requirement) | 1.5 | ML/week |
| WTP Design Treatment Volume | 250 | kL/day |
| Number of groundwater Extraction Wells - Developed Concept Well Field Design) | Up to 20 | ea |
| Design Extraction Rate | 2.9 | L/s |
| Distance from Extraction Wells to WTP | ~650 | m |
| Extraction Pump Design Specification - Flow Rate for Developed Concept Well Field Design | 0.14 to 0.2 @ 20 | L/s mbgs |
| Number of Treated Water Reinjection Wells | Up to 8 | ea |
| Design Reinjection/Dispersion Rate | 2.9 | L/s |
| Distance from WTP to Reinjection Wells Contractual Qty Up to 150 m above ground poly pipeline. | ~430 | m |
| Maximum PFOS + PFHxS | <0.07 | µg/L |
| Maximum PFOA | <0.56 | µg/L |
| Five Consecutive Sample Rolling Arithmetic Mean of PFOS + PFHxS | <0.02 | µg/L |
| Preliminary Water Quality Parameters for Recovering Aquifer | Parameters under assessment | |

DESIGN PHILOSOPHY

The WTP will require 24/7 operation capability, excluding scheduled and reactive maintenance, with manned periods Monday to Saturday during the day. The system has been designed with consideration of the following criteria:—

- System design based on performance with waste minimisation.
- Equipment selection based on robust and continuous operation.
- Modular plant design that reduces dependence between unit processes in each treatment stage.
- Plant design that allows flexibility for bypassing, upscaling or downscaling of certain stages as necessary.
- Process structure that allows minimal disruption to operations for maintenance, resin rejuvenation or replacement.
- Process design that utilises "Lead—Lag—Standby" carousel for polishing resin to minimise risk of resin breakthrough.
- Control system that provides a complete process overview with alarms and functional protection.
- Control system that allows remote notification of system alarms at High Level and Low Level setpoints.
- Control system that automatically closes any associated stage solenoid valves and/or stops pump operations when High-High Level and Low-Low Level setpoints have been activated.
- System design to minimise potential exposure to PFAS affected water or waste.

Figure 5:
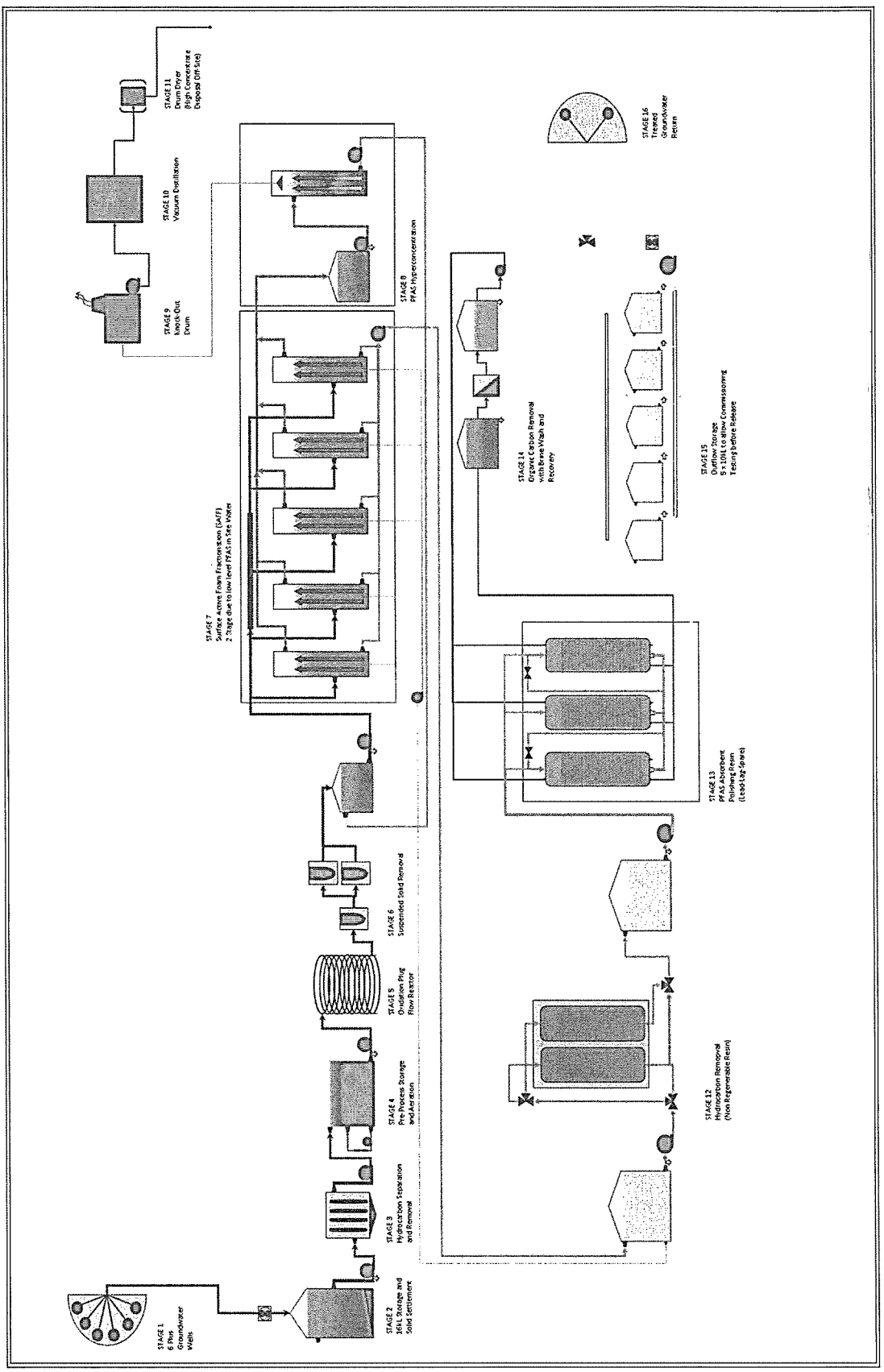
FIG. 5 shows a schematic side, sectional, elevation view of a full water treatment plant (WTP) for the removal of PFAS from impacted groundwater at an aviation site over 16 Stages, the apparatus including multiple batch chambers arranged in parallel to one another and each arranged to produce a froth layer which is formed at, and which rises above, an interface with the said flow of water and of introduced gas in each chamber, the froth layer water controlled so that it includes a concentrated amount of the substance when compared with its initial concentration, in accordance with an embodiment of the present disclosure.

FIG. 5 illustrates the WTP System Schematic/Process Flow Diagram that identifies all stages from groundwater extraction (Stage 1) through to treated water return/reinjection (Stage 16). Each stage will now be described.

Figure 6:
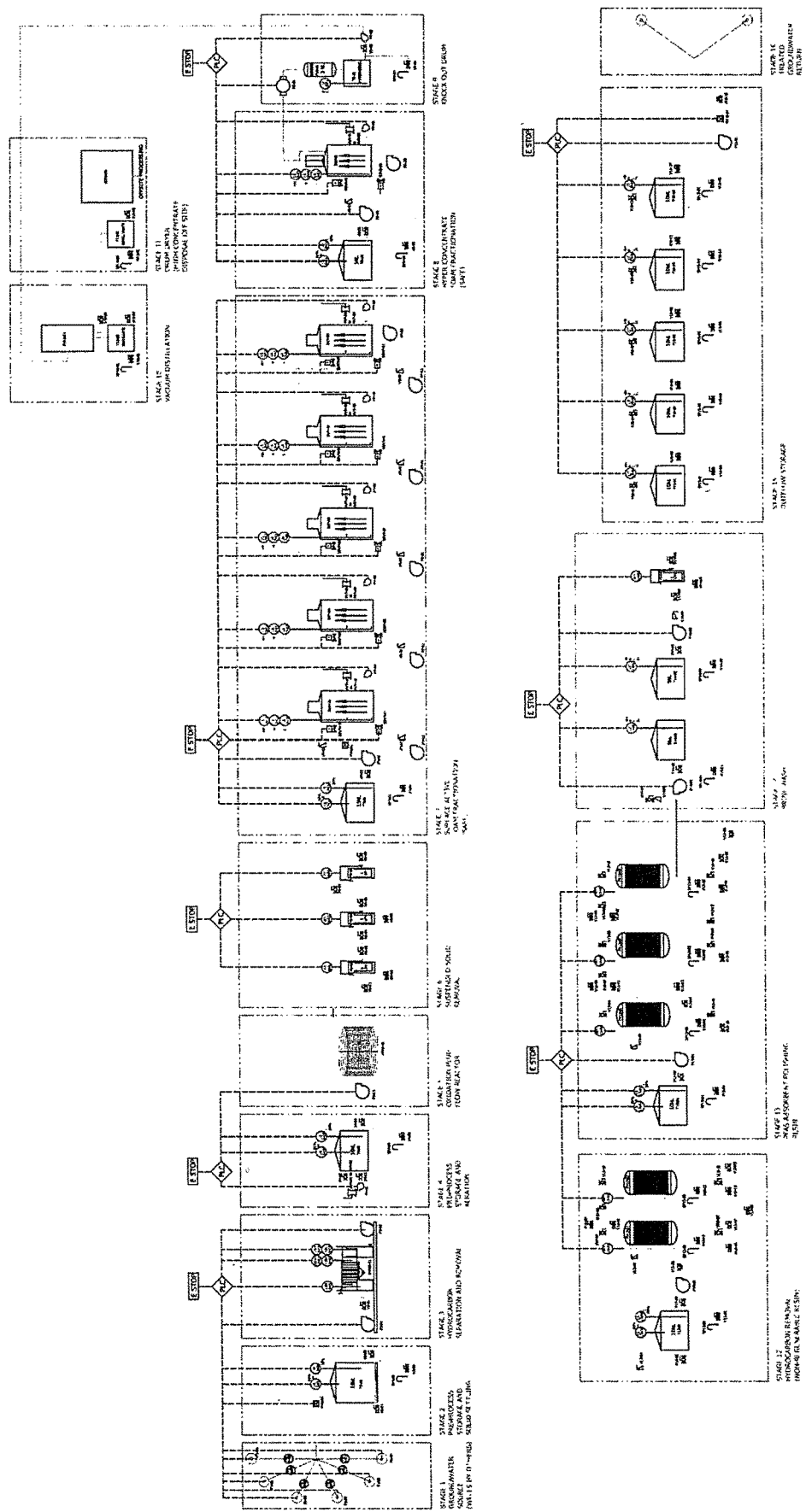
FIG. 6 shows a schematic side, sectional, elevation view of the component parts of the water treatment plant (WTP) of FIG. 5, in the form of a system control diagram.
Figure 7A:
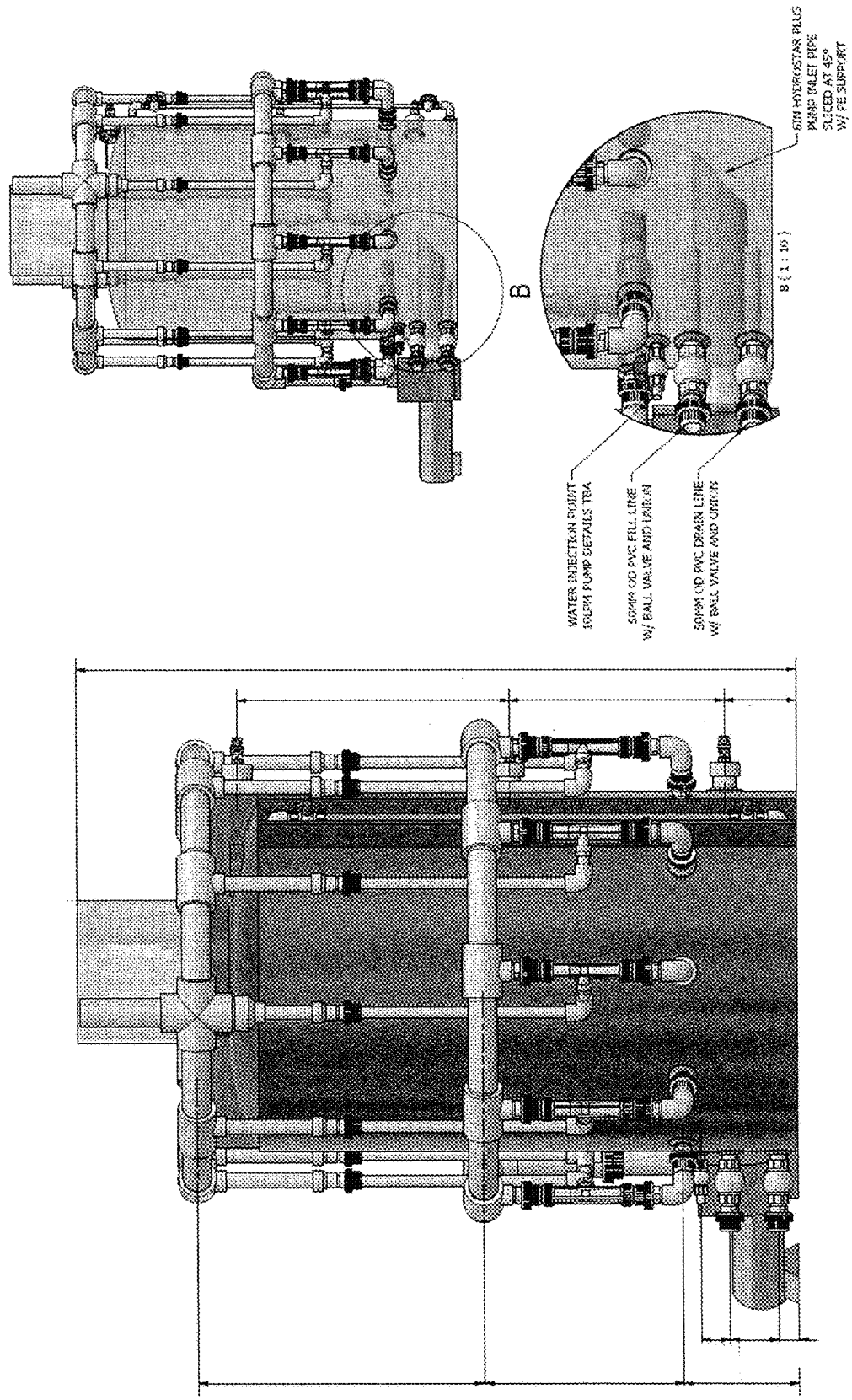
FIG. 7A shows a side elevational view of the foam flotation separation apparatus for removal of a substance from water of FIG. 7.

The WTP process flow diagram has been developed in a manner that the stages are independent of each other to ensure performance of each stage is optimal. Where possible, each stage has its own storage/feed tank that allows level control to provide over fill protection from the previous stage and also pump protection for the current stage. This also allows pumps to operate at their specified design parameters utilising simple level control for on/off operation. The WTP process flow control diagram for the system is shown in FIG. 6.

Stage 1—Ground Water Source

Stage 1 scope of work includes supply, installation, commissioning and operation of the groundwater well pumps and pipeline from the groundwater well location to the WTP.

The well field design includes up to 20 extraction wells that require approximately 650 m of pipeline; and up to 8 reinjection wells that require approximately 430 m of pipeline from the WTP location. The extraction wells have been categorised as high, medium and low priority based on their expected yields and PFAS concentration levels. There are 9 high priority, 7 medium priority and 4 low priority extraction wells, all of which are located within very densely populated underground service areas and with 6 of the extraction wells located in areas that are at risk of drawing hydrocarbon contamination from a light non-aqueous phase liquid plume.

Similarly, the reinjection wells have been categorised with 4 high priority, 2 medium priority and 2 low priority wells.

The principal behind categorising the well network is to develop the high priority wells first and test their yield characteristics immediately following drilling to ascertain whether the lower priority wells require development and to potentially save costs to the project.

The WTP has been designed to process 250 kL per day, which will meet the contractual volume of 1.5 ML/week. The 250 kL per day process requirement is equivalent to 174 L/min or 2.9 L/s if operated on a 24/7 basis.

All pipework between the groundwater well manifold point and the WTP will be buried HDPE pipe. Current sizing and specification will be Pressure Pipe to AS/NZS 4130, DN63 SDR11 PN16 PE 100 (black with blue stripe) which will experience a flow velocity of approximately 1.5 m/s under full flow of 2.9 L/s and is rated to 1,600 kPa at 20° C. A common trench will be utilised for the water pipe, electrical conduits/cabling and communications/control cabling.

Stage 2—Pre-Process Storage and Solid Settling

Stage 2 of the WTP is identified as pre-process storage and solid settling. The primary purpose of this stage is to allow settling of suspended solids from the extracted groundwater prior to the WTP process. A 16 kL sloping bottom tank has been selected to allow the suspended solids sludge to be removed from a low point drain without having to empty the tank, or halt the process and enter the tank. The treatment water outlet of this tank will be set well above the tank bottom to ensure any settled solids are not disturbed or mixed during delivery to the following stages. Sludge waste from this tank will be removed, dried and disposed of.

A sampling point (SP2-01) has been included in Stage 2 to allow analysis of the incoming ground water before any processing by the WTP. This stage also includes a flowmeter that will be used to measure and record total source water flow rates and cumulative flow volumes.

Stage 3—Hydrocarbon Separation and Removal

Stage 3 of the WTP is identified as hydrocarbon separation and removal. Hydrocarbons are frequently found in groundwater at a military air base and can have a deleterious effect on downstream processes such as foam flotation as well as contaminating ion exchange resins.

This stage includes a Baldwin Oily Water Separator (OWS) or coalescing plate separator (CPS). The Baldwin Oily Water Separator removes any free phase hydrocarbons from the groundwater based on Stokes' Law which is the physical law governing the settling/rise rate of a particle/droplet in a fluid stream. The groundwater is drawn from the tank through a non-emulsifying diaphragm pump to the above ground coalescing plate separator. The CPS is designed to remove non-dissolved hydrocarbons and suspended solids to a level suitable for discharge to stormwater. The water passes through the coalescing plates and then through a polishing chamber before being stored in a discharge chamber. There will be three waste streams from the CPS. Solid waste will be collected from the low point drain under the coalescing plate of the CPS. Free phase hydrocarbons will be separated into a collection tank within the CPS and drained from the low point drain. The fabric based polishing filters will be replaced on an 'as required' basis when they become saturated with hydrocarbons. All waste will be removed, dried (where appropriate) and disposed of.

Stage 4—Pre-Process Storage and Aeration

Stage 4 includes a 10 kL storage tank for the purposes of aeration prior to stage 5. Calculation identified that Fe (the main analyte of concern) could be effectively oxidised by aeration and a mechanical process was decided to be most practical. A mechanical process using venturis or diffusers, only adds air and dissolved oxygen to the groundwater and removes the requirement for hazardous chemical storage, handling and treatment, and is also less likely to have broader effects on the groundwater composition.

Oxidation will be achieved by utilising a high flow pump connected to several venturis, which will introduce air bubbles and oxygen into the water. The introduced air will facilitate the oxidation of the dissolved Iron (Fe) and Manganese (Mn) whose oxides will precipitate from solution to allow filtration removal in Stage 6. Removing these ions depends on the groundwater at the site and the extent of the downstream effects on the foam fractionation stages.

The tank has been sized to 10 kL and will be fitted with a single pump with 2×50 mm venturis providing adequate aeration for the volume. This tank will also provide additional storage equivalent to 1 hour of full flow WTP operation to reduce the dependency of the WTP on the Oily Water Separator or filtration maintenance.

The Stage 4 tank will include high and low level sensors for the control of the Stage 3 Oily Water Separator pump operation and also to provide pump protection of the following stage pump respectively. A sampling point (SP4-01) has been included in Stage 4 to allow analysis of the Oily Water Separator treatment prior to the oxidation plug flow reactor.

Stage 5—Oxidation Plug Flow Reactor

Stage 5 of the WTP is identified as an oxidation plug flow reactor and allows the aerated water from stage 5 to extend the dwell time for oxidation and precipitation of Fe and Mn. The process is a simple mechanical method of extending the water path whilst maintaining the same plug or volume of water, allowing the reaction with the dissolved oxygen for a longer period of time. The plug flow reactor will be fabricated from coils of polyethylene pipe that will produce an 800 m long route for the water to pass. The water will be subject to elevated temperature from the black polyethylene pipe, which will further aid the oxidation process.

Stage 6—Suspended Solid Removal

Stage 6 includes a series of bag filters for the removal of fine suspended solid particulates. The first stage of filtration will utilise 5-micron filter bags to remove larger particulates. The second stage will utilise two 1-micron absolute filters in parallel to maintain the required flowrate. Pressure differential alarms have been included across all filters to monitor filter media levels and alarm through the PLC prior to pump shut down.

Waste collected in the filters will be removed, dried and disposed of. A sampling point (SP7-01) has been included after Stage 6 to allow analysis of the treated water following that stage.

Stage 7—Surface Active Foam Fractionation (SAFF)

Stage 7 of the WTP is identified as surface-active foam fractionation (SAFF) and initially involves pumping the pre-treated groundwater into a series of five 2 kL fractionation vessels. Vessel filling, fractionation and draining will be undertaken in a staged, batch process so by the time the fifth vessel is filled, fractionation of the first vessel will have been completed and that vessel will have been drained. This process allows for one feed pump to fill all five vessels and one discharge pump to drain all five vessels. The process will be run on a continuous 24/7 basis with fractionation ceasing only for maintenance or where low groundwater flow rates are experienced which introduces process delays between stages.

Due to the low concentrations of PFAS in the groundwater, using a primary vacuum based foam extraction system in every vessel at this stage of the process would consume a lot of energy to extract very little foam. Testwork showed that using a fractionation suction device as part of a staged process was quite satisfactory at removing PFAS from water at relatively high concentrations.

The staged process adopted involves initially filling the vessel to a starting height which is established to ensure that not too much water/foam is ejected through the hood during start-up aeration. After the initial load of surface active PFAS is pushed through the hood as foam (usually in less than 5 min) the operator introduces a low flow overflow feed of the same original source water into the main tank which causes the minimal residual PFAS gathering at the water surface to overflow out the top of the conical chimney/clear cap which is located at the top of the lid of each tank. This upper tank cap allows a visual inspection of what is taking place inside the tanks, allows an operator to study the condition of the froth, and also gives a quick visual indication of water level.

In conjunction with this overflow process, the inventors discovered that by orientating the 90-degree angle bends located at the end of the air pipes which carry air into the tanks via the venturi nozzle and into the interior of the tank in one direction, a circular swirl action resulted. This had had some positive benefit by reducing the apparent turbulence of the water surface in the hood. If the venturi outlets inside the tank all pointed in one direction tangential to the tank interior wall, this introduced a circular swirl action, which reduced the apparent turbulence of the water surface inside the tank, while also reducing the coalescence of bubbles (as observed by underwater camera) to create a generally smooth swirl vortex inside the tank. By having a laminar flow around the inside walls, this assists the general reduction of turbulent flow in the tank and therefore contributes to a much more stable flow of froth layer atop of the interface, to help it stably move out of the foam fractionation vessel.

FIGS. 7, 7A, 8, 8A and 8B are drawings of the SAFF fractionation vessel which shows the rings of water and air piping manifolds, which service the venturis which are located at the base of the tank and also the hood. These SAFF units are effectively operating in batch mode, to extract the maximum recovery of PFAS into the foam concentrates.

The work has shown that in the first stage of treatment of 250,000 L of contaminated liquid sent to batch SAFF will produce 12500 L of concentrate (containing a concentration of PFAS 581 µg/L), and 237,500 L of underflow with organics removed with a concentration of PFAS of 1 µg/L. This represents a volume reduction of 95%, and concentration factor of 581/30=19.3.

The PFAS rich foam/liquid concentrate generated from the top of the five fractionation vessels will be directed to a 5 kL storage tank in Stage 8 where it will be collected for filling of the hyper concentrate fractionation vessel.

Table 7 illustrates the expected reduction in water volume and associated increase in concentration of PFAS levels throughout the WTP process.

Treated water drained from the Stage 7 fractionation vessels (representing approximately 95% of the total inflow) will be pumped to the resin treatment stages of the WTP with an estimated PFAS concentration of less than 1 µg/L.

The PFAS enriched concentrate from the Stage 7 fractionators (representing approximately 5% of the total inflow) will be directed to the hyper-concentration unit in Stage 8.

A sampling point (SP8-01) has been included at the storage tank (T8-01) following the Stage 7 SAFF vessels to allow analysis of the PFAS concentrated waste water prior to hyper-concentration. A sampling point (SP12-01) has been included at the storage tank (T12-01) at stage 12 to allow analysis of the treated water following fractionation and prior to resin treatment.

Stage 8—Hyper-concentrator

Stage 8 of the WTP consists of a 5 kL PEAS concentrate storage tank (T8-01) and hyper-concentrate fractionation vessel. The hyper-concentrator will operate independently of the Stage 7 fractionation vessels and can be turned on and off as needed as it works on a much smaller volume of PAS affected water.

The hyper-concentrator will utilise a similar method to that of the Stage 7 fractionation vessels with the addition of PFAS rich foam extraction under vacuum and sent to the next stage knock-out drum. The treated water from the hyper-concentrator vessel will be returned to the Stage 7 storage tank for reprocessing.

Vacuum suction foam extraction system is featured in the top of the hyper-concentrator vessel. This vessel will take the foam and overflow water produced from the primary vessels and refractionate this fluid using a staged approach. However, in the hyper-concentrator vessel, after the initial foaming (~5 min), a low flow top-up feed is introduced to raise the water level in the vessel so that it sits just below (~50 mm) below a vacuum extraction device. In one form shown in the drawing, a flat plate is used as the suction hood device, which is fixed within the narrower neck at the top of the hood section of the foam fractionation tank. As fluid/foam is removed from vessel, the top up feed continues to operate during the (approximately 25 minute) fractionation process, but is regulated using a high/low float level detection system to ensure that the vacuum plate stays at an optimal distance from the water surface/meniscus/interface with the foam.

Figure 9:
FIG. 9 shows a schematic perspective and sectional view of the foam flotation separation apparatus for secondary stage removal (reconcentration, or hyper-concentration) of a substance from water after it has already been concentrated used the primary stage apparatus shown in FIG. 7 and FIG. 8. The apparatus of FIG. 9 shows the vessel shape and air inlet system, in accordance with an embodiment of the present disclosure.

The swirl action is also being adopted in the hyper-concentrator as it seems to also reduce turbulence in the upper water interface and, as a consequence, produces a dryer foamate (see FIG. 9). The second stage of treatment to re-separate the first concentrate to produce a hyper-concentrate has an input of 12,500 L to batch SAFF to produce 312.5 L of concentrate (containing a concentration of PFAS of 21,162 µg/L), and 12187.5 L of underflow with PFAS of 2 µg/L (which is sent back to the primary stage batch flotation). This represents a volume reduction of 97.5%, and concentration factor of 21,162/581=36.

Stage 9—Knock Out Drum

Stage 9 of the WTP is identified as a knock-out drum. The hyper-concentrated PFAS foamate extracted from the hood of the hyper-concentrate vessel is drawn into the knock-out drum under vacuum. The hyper-concentrate liquid is then pumped to the vacuum distillation system for further volume reduction.

Stage 10—Vacuum Distillation

The vacuum distillation system is a low energy vacuum distillation process which boils the water content from the waste stream off under vacuum at around 37° C. The principle of the vacuum distillation phase is that all substances having higher boiling points than water stay in the evaporation residue. This includes heavy metals, salts as well as oils and fats. PFOS has a boiling point of 259° C. and PFOA boils at 192.4° C. As the clean water evaporates, the evaporation residue (i.e. the PFAS hyper-concentrate) volume is reduced to anywhere between 0.5 and 5 percent of the original wastewater volume. The emerging vapour is practically free of impurities. As this clean steam passes through the distillation columns within the evaporator it is cooled back to a pure liquid.

A sampling point (SP10-01) has been included at the storage tank (T10-01) to allow analysis of the distilled water following that vacuum distillation process.

Distilled water from the vacuum evaporator will be transferred to the storage tank (T7-01) for re-processing. The volume of distilled water produced on a daily basis is expected to be in the order of 300 litres per day. A sampling point (SP10-01) has been included at the storage tank (T11-01) to allow analysis of the distilled water produced by the vacuum distillation process.

Stage 11—Drum Dryer

Stage 11 represents the last of the waste minimisation processes and aims to further reduce the moisture content in the liquid from the distillation unit. The liquids will be pumped into a 200 L disposal drum encapsulated within the drum dryer which heats from the outside of the drum. Since the heating elements do not contact the liquid, there is no requirement to clean the heat transfer surface. Temperatures are controlled with a thermocouple and timer system to provide consistent heating and accurate level of dryness. Hi torque motor with reduction gearing provide a gentle and consistent agitation process, even as solutions become more viscous and solid. A pneumatic lifting system allows easy removal of lid and agitator system at the completion of this drying phase. Hinged clamshell walls along with pneumatic lifting system allow easy removal of drum and dolly for loading and unloading.

Stage 12—Hydrocarbon Removal Resin

To protect and extend the lifespan of the PFAS polishing resins at the end of the treatment train (Stage 13), the inventors will install a Duty-Standby system containing an ion exchange hydrocarbon "scavenging" resin. The frequency of scavenging resin replacement is yet to be determined and will depend on the concentration and type of hydrocarbon exposure. Expired resins will be removed, dried and disposed of.

Stage 13—PFAS Absorbent Polishing Resin

Stage 13 of the WTP is identified as PFAS polishing resin and is used to remove any residual PFAS in the treated water. The PFAS absorbent polishing resin is a critical part of the process and as such, it was decided to expand the infrastructure from what was offered in the DCAP to include three resin vessels in a "Lead-Lag-Standby" configuration.

Pipework has been designed to allow a carousel style operation where Vessel A will start as the Lead, Vessel B as the Lag in series and Vessel C as the Standby. The Lead vessel will be subject to the initial flow and as such, will do the most work and be depleted or fouled first. Once resin breakthrough or fouling occurs in Vessel A, the pipework will be reconfigured so that Vessel B becomes the Lead, Vessel C the Lag and Vessel A the Standby. Whilst a vessel is in standby mode, it will be backwashed. Expired resins will be removed, dried and disposed of.

Stage 14—Caustic/Brine Wash and Recovery

Stage 14 incorporates a treated water backwash to remove foulants, followed by a brine soak to minimise biofouling. A supply storage tank (T14-01) is utilised to generate and mix the brine solution. On a regular basis, the Lead vessel will be taken offline and subject to a back wash from the treated water tank (T14-02). The treated backwash water will be circulated through a filter (F14-01) to remove any foulants before being returned to its storage tank. On completion of the backwash process, the vessel will be filled with brine water to inhibit formation of bio-foulants during the Standby period.

Stage 15—Outflow Storage

Stage 15 of the WTP is identified as outflow storage. This stage consists of five 10,000 L tanks in a manifolded system to allow individual tank storage and discharge in 10,000 L batches, or combined storage and discharge of 50,000 L. During the commissioning phase, the tanks will be utilised in the individual configuration, allowing treatment, testing and storage on up to five consecutive days before discharging the treated water to reinjection if acceptable or returning the treated water to the WTP if unacceptable. Once the commissioning phase is complete and the WTP is proven under "Normal Operation", the outflow storage will be manifolded as one large storage vessel prior to reinjection.

Sampling points (SP15-01 to SP15-05) have been included on all outflow storage tanks to allow testing of treated water on individual tanks. Stage 15 also includes a flowmeter that will be used to measure and record return treated water flow rates and cumulative flow volumes.

Stage 16—Treated Groundwater Return or Reuse

Stage 16 of the WTP is identified as the treated groundwater return or reuse. There are alternate options for treated groundwater reuse or reinjection. In regard to reinjection, the WTP has 8 reinjection wells that have been classified as 4 high priority, 2 medium priority and 2 low priority.

Inventors have allowed to install 150 m of above ground poly pipe between the WTP and the reinjection points to allow the gravity feed of water to the wells.

Waste Management

The WTP has been designed to minimise the production of waste. Wherever possible, mechanical means have been employed to extract and concentrate wastes to minimise management and disposal costs. The following table summarises the waste produced and method of disposal proposed for each relevant stage of the WTP.

| Stage | Waste Type | Approx. Volume/Mass | Management | Disposal Method |
|---|---|---|---|---|
| 2, 3 | Sediment and solid particulates | Unknown. Dependent on well performance. | We have installed a sloping bottom tank to allow removal of solids. | Reduced via Stage 11 (Drum Dryer) and disposed of. |
| 3 | Liquid Hydrocarbons and polishing filters | Unknown. Dependent on groundwater source. | Liquid hydrocarbons drained from OWS into container. Polishing filters removed and replaced | Reduced via Stage 11 (Drum Dryer) and disposed of. |
| 6 | Fe and Mn Precipitates in Bag Filters | 50 kg/day wet, reduced to 12.5 kg/day dry | Filter Bags removed and replaced when differential pressure alarms. | Reduced via Stage 11 (Drum Dryer) and disposed |
| 7 | PFAS affected Water (Low PFAS Level) | 237,500 L/day | Transfer to Stage 12, 13 for Resin removal of hydrocarbons and PFAS | No external waste |
| 7 | PFAS Concentrate (Moderate PFAS Level) | 12,500 L/day | Transfer to Stage 8 for further Treatment | No external waste |
| 8 | PFAS affected Water Low Level PFAS) | 12,188 L/day | Return to Stage 7 for re-processing | No external waste |
| 8 | PFAS Concentrate (High Level PFAS) | 312 L/day | Transfer to Stage 9, 10 | No external waste |
| 10 | PFAS affected distillate | 297 L/day | Return to Stage 7 for re-processing | No external waste |
| 10 | PFAS Hyper Concentrate | 15 L/day | Transfer to Stage 11 | Reduced via Stage 11 (Drum Dryer) and disposed of. |
| 12 | PFAS/Hydrocarbon impacted Resin | 4000 L/project | Transfer to Stage 11 | Reduced via Stage 11 (Drum Dryer) and disposed of. |

-continued

| Stage | Waste Type | Approx. Volume/ Mass | Management | Disposal Method |
|---|---|---|---|---|
| 13 | PFAS impacted Polishing Resin | 6000 L/project | Transfer to Stage 11 | Reduced via Stage 11 (Drum Dryer) and disposed of. |
| 14 | Backwash foulants | 2 kg/day wet, reduced to 0.5 kg/day dry | Filter Bags removed and replaced when differential pressure alarms. | Reduced via Stage 11 (Drum Dryer) and disposed of. |

Table 7 below indicates the design waste volume reduction and PFAS concentrate levels expected through the WTP process. These figures are based on the daily treatment volume of 250 kL.

TABLE 3

Waste Volume Reduction and PFAS Concentrate Levels

| Stage | Description | Volume In- L/day (PFAS Level) | Volume Processed- L/day (PFAS Level) | Concentrate/ Waste-L/day (PFAS Level) | Reduced Volume- % | Operating Time- Hrs/day |
|---|---|---|---|---|---|---|
| 7 | First stage (5× vessels) | 250,000 (30 µg/L) | 225,000 (~1 µg/L) | 12,500 (581 g/L) | 5% | 24 |
| 8 | Hyper- concentrator | 12,500 (581 µg/L) | 12,187.5 (~2 µg/L) Returned to Stage 7 above | 312.5 (23,162 µg/L) | 2.5% | 8 |
| 10 | Knock Out Drum | 250 | | 250 | 100% | 4 |
| 10 | Vacuum Distillation | 312.5 (23,162 µg/L) | 296.9 (42 µg/L) Returned to Stage 7 above | 15.6 (600,000 µg/L) | 5% | 4 |
| 11 | Drum Dryer | 12.5 (600,000 µg/L) | 10 (0 µg/L) | 3.125 (2,312,210 µg/L) | 20% | 4 |

Figure 10:
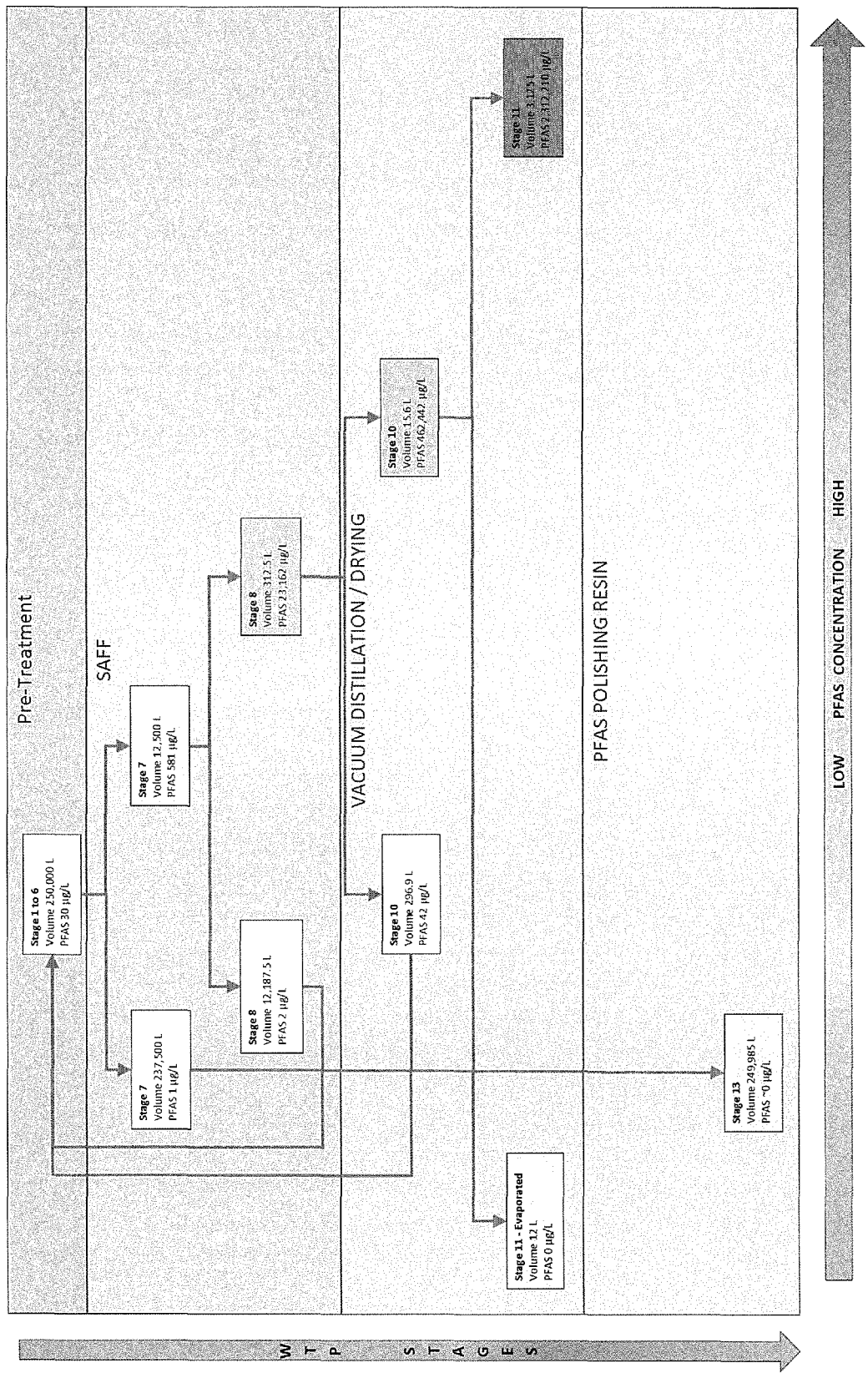
FIG. 10 shows a schematic flow diagram of the experimental results achieved using the laboratory pilot-scale foam flotation separation apparatus for both primary and secondary stage removal of a substance from water. The design of some of the apparatus is shown in FIG. 7, FIG. 8 and FIG. 9.

FIG. 10 illustrates the expected reduction in volume and increase in PFAS concentration through the various stages of the WTP based on testing carried out in the laboratory. The stages within the WTP have been grouped as follows:—

Pre-Treatment

SAFF

Vacuum Distillation/Drying

PFAS Polishing Resins

The SAFF process is fundamental in bulk water treatment to significantly reduce the PFAS level, resulting in approximately 99% of the groundwater being reduced to a PFAS level of approximately 1 µg/L and less than 1% of the initial volume concentrated up by a factor of 200 times the original PFAS levels. The next stage of vacuum distillation and drying further reduces the volume of the SAFF waste stream from 1,250 L at approximately 6,000 µg/L down to 2.5 L at approximately 3,000,000 µg/L, which equates to further concentration factor of 500 times.

The SAFF treated water is then passed through the PFAS polishing resins, reducing the level from approximately 1 µg/L to levels that satisfy the contractual requirement. The WTP benefits from the SAFF process managing the majority of PFAS removal/reduction to ensure that the PFAS polishing resin can work effectively and efficiently, whilst minimising the waste generated.

Water Treatment Plant (WTP) Layout

The WTP has been designed to fit on an overall footprint of 35 m×25 m that will be fenced and secured from general access. The design also includes a bunded area of 25 m×15 m, where all PFAS containing equipment will be housed. Asphalt was considered for bund material of construction however concrete has been selected as it will handle the elevated temperatures without distortion and is more resilient to forklift and crane traffic. Concrete is also subject to PFAS absorption and the bund surface will be sealed/painted to reduce this risk.

A road-base style hardstand will be laid in the footprint of the WTP to raise the level of the complete WTP site. The concrete bund will then be constructed on top of the hard stand to further increase the elevation from normal ground level and to ensure no ingress of pooled water during rain events. The surface of the bund will have a fall to a low point sump that will allow first flush retention and processing through the WTP. The sump will be located in the vicinity of the Stage 2 storage tanks to allow easy transfer of rain water to the WTP in the first instance and then diverted to the surrounding surface water drainage system following the first flush. Sump level control will be utilised to establish a suitable volume for first flush.

Figure 11:
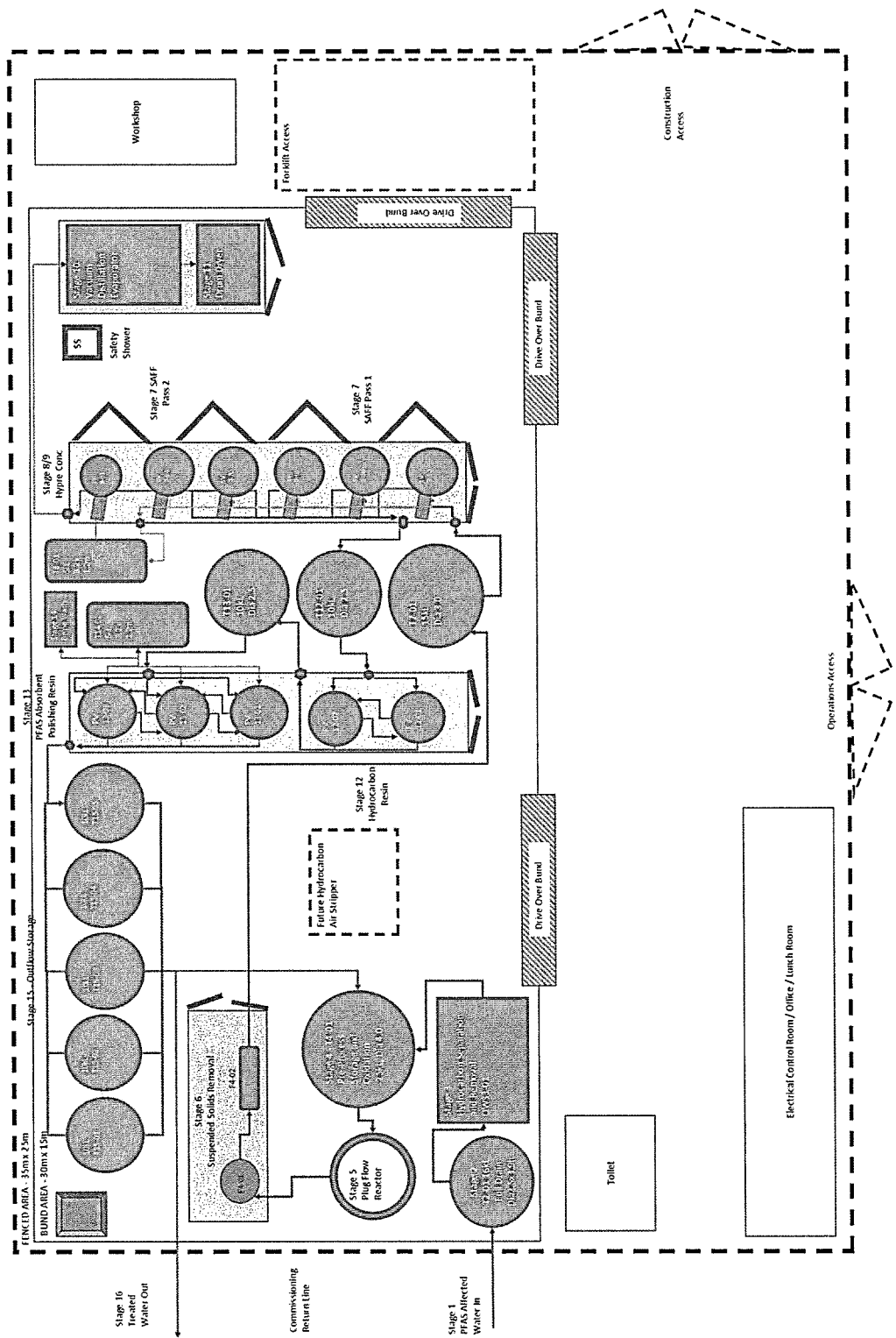
FIG. 11 shows a schematic top plan view of the component parts of the water treatment plant (WTP) of FIG. 5, in the form of a site layout diagram.
Figure 12:
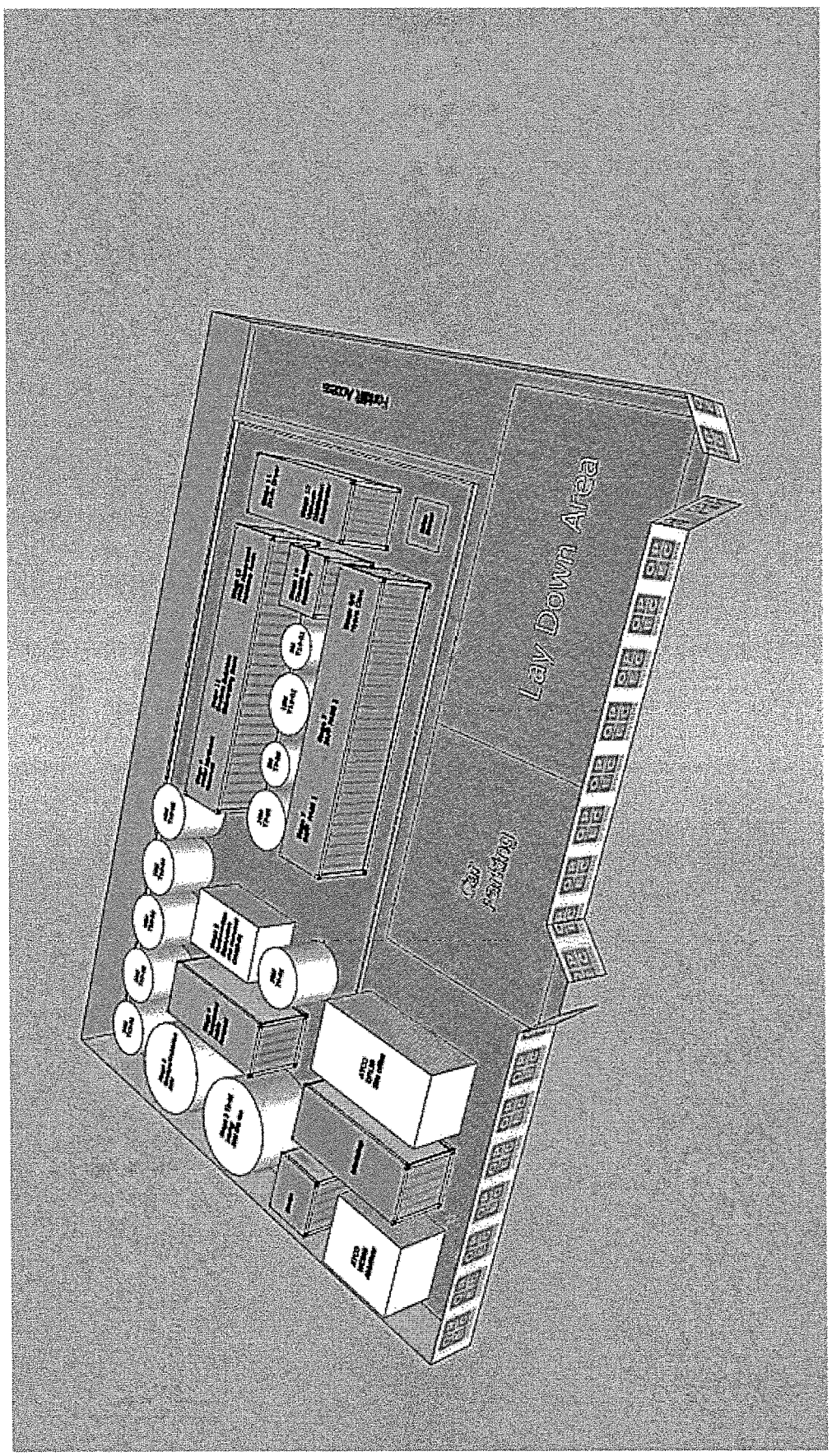
FIG. 12 shows a schematic, perspective view of the component parts of the water treatment plant (WTP) of FIG. 5 and FIG. 11.

FIG. 11 and FIG. 12 illustrate the WTP layout based on the current design and process flow.

FUNCTIONAL DESCRIPTION

The WTP will be operated from a central PLC that will be used to manage, record as necessary and report operations from Stage 1 through Stage 16. As identified earlier in this report, the system has been designed to ensure independence between stages to simplify the control process and produce a robust fit for purpose design. Many of the stages will utilise a similar and simple logic for operations of that stage as identified below:

The pump operation for a stage will require confirmation that the high level (H) of the receiving stage storage tank has not been triggered to ensure capacity is available before that operation commences.

If the receiving tank storage capacity is reached during operation, the high level (H) alarm will provide warning and if not ceased by the operator, the high-high level (HH) set point will automatically cease operation of that pump.

The pump will only re-commence after the high level (H) of that storage tank has automatically reset as a result of the volume in the receiving tank being reduced by operations downstream.

The pump will also have protection from the level control of the supply storage tank, whereby the supply tank low level (L) alarm will provide warning and if not ceased by the operator, the low-low level (LL) set point will automatically cease operation of that pump to ensure the pump does not run dry.

Filter housings will have a differential pressure indicator across the filter medium that will indicate a pressure drop as the filter becomes blocked or filled. A pressure differential set point will be used to raise an alarm. A further set point will be used to cease operation of the supply pump if not corrected by the operator.

SAFF vessels will have level switches to identify the fill and drain limits. The vessels will also utilise pneumatic operated valves (POV) for fill and drain operations. One common pump will be used to fill all four SAFF columns and another common pump to drain all columns respectively. The POV on the fill side will not be able to open if the high level (H) set point has been reached. Similarly, the POV on the drain side will only be able to open if the low level (L) has not been reached. The fill pump will only be able to operate when the fill POV is open and similarly, the drain pump will only be able to operate when the drain POV is open.

The SAFF process will be sequence driven with a fill, process and drain operation. The fill POV will open, allowing the fill pump to operate and fill the vessel. Once the water level reached the high level (H) alarm, the pump will stop. This will also start the process cycle which will commence operation of the venturi pumps. After a predetermined time, the venturi pumps will stop and the drain POV will open, allowing the drain pump to operate until the low level (L) is reached that will stop the drain pump. The same sequence will be followed for all four SAFF vessels on a continuous basis.

SAFETY MEASURES IN THE DESIGN

The WTP will be constructed and operated on a bunded footprint that will have the capacity to retain the largest combined vessel volume of 50,000 L plus 5%, resulting in a bund height of ~120 mm based on a footprint of 25 m×15 m. To provide further protection, the containers will also be bunded to ensure any potential leak from the process is initially contained within the container. Sensors will be implemented in the container bunds to alarm if any leak occurs, noting that the plant will operate 24/7 but only be manned for 5-½ days per week.

The control process will alarm when a limit is reached and then will stop operations when the second set point is reached. The alarm process will also send a message to the operator to allow review or mobilisation to site if not on site. Surveillance cameras may be introduced for operational monitoring and to allow remote inspection for any alarm notification.

The facility has been designed with a layout that supports the process flow and also minimises access to areas that do not require attention. Container access will be provided to allow ease of construction, inspection and maintenance. Accessibility has been considered for forklift/trolley access to plant that requires media changeout or manual handling. The stages that contain the higher concentrates of PFAS have been grouped and will be segregated from other working areas where practicable.

An E-Stop system will be implemented to allow immediate shutdown of operations. The E-Stops will be located within easy access of general work areas within the facility and an emergency eye wash/shower station has been included in the vicinity of the higher concentrated PFAS areas as indicated in the WTP layout above.

Throughout this specification, the words "froth" and "foam" may be used interchangeably but are taken to mean the same thing, essentially comprising a wet liquid concentrate having low quantities of particulate materials or concentrated organic contaminants, and extracted by various designs of devices which aim to provide as much control and reduction of the water content in the froth layer as possible.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower", "above" and "below" and the like are used as words of convenience to provide reference points and are not to be construed as limiting terms.

The reference in this specification to any prior publication or information is not, and should not be taken as, an acknowledgement or admission or any form of suggestion that the prior publication or information forms part of the common general knowledge in the field of endeavor to which this specification relates.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. A method of separating an amount of a substance from water which is contaminated with the substance, the method comprising the steps of:
   admitting an amount of the water, which includes an initial concentration of the substance, into a chamber via an inlet thereinto;
   introducing a flow of gas into the chamber, wherein said introduced gas induces the water in the chamber to flow, and produces a froth layer which is formed at, and which rises above, an interface with the said flow of water and of introduced gas in the chamber, the froth layer including an amount of water and also a concentrated amount of the substance when compared with its initial concentration;
   controlling the water content of the froth layer above the interface by use of a flow controller and an inlet valve to physically control the flow of said introduced gas into the chamber, along with use of a device for confining the cross-sectional flow path of the froth layer in the upper portion of the chamber, resulting in drainage of said froth layer, thereby influencing the concentration of the substance in said froth layer; and
   removing at least some of the froth layer from an upper portion of the chamber,
   wherein the froth layer is collapsed into a separate containment apparatus during said removal step from the upper portion of the chamber, and prior to undergoing a secondary treatment step for treating said collapsed froth layer including the concentrated substance, and
   wherein said secondary treatment step comprises the introduction of a further quantity of gas into said separate containment apparatus to produce another froth layer comprising a further concentrated amount of the substance.

2. A method as claimed in claim 1, wherein the flow of gas and the production of the froth layer in the chamber is continuous in operation.

3. A method as claimed in claim 1, wherein, when a froth depth regulation device is arranged at a fixed location within the chamber, and the location of the interface is responsive to at least one of the flow of the introduced gas, and an inlet flow of the water.

4. A method as claimed in claim 1, wherein the step of controlling the water content of the froth layer comprises the use of a froth depth regulation device for maintaining a depth of the froth layer above the interface, the device being arranged to be vertically moveably positionable in an axial direction within the chamber in response to movement of the location of the interface.

5. A method of separating an amount of an organic substance from water which is contaminated with the organic substance, said organic substance being at least one of a perfluoroalkyl or a polyfluoroalkyl substance (PFAS), the method comprising the steps of:
   admitting said contaminated water into a chamber via an inlet thereinto;
   introducing a flow of gas into a lowermost region of the chamber, wherein the introduced gas induces an upward flow of water in the chamber, and produces a froth layer which rises above an interface with the water in an upper portion of the chamber, the froth layer including a concentrated amount of the substance when compared with its concentration in the contaminated water first admitted to the chamber;
   collecting a sufficient amount of said froth layer and, after allowing it to collapse back into a liquid form, passing said liquid to a second chamber via an inlet thereinto;
   introducing a flow of gas into a lowermost region of the second chamber, wherein the introduced gas induces an upward flow of water in said chamber, and produces a froth layer which rises above an interface with the water in an upper portion of the second chamber, the froth layer including a further concentrated amount of the substance;
   The froth layer above the interface in the second chamber being subject to a froth layer depth regulation system comprising a froth depth regulation device which is arranged to maintain a froth layer depth; and wherein in said second chamber, the method comprises the steps of regulating at least one of;
   (i) depth of the froth layer above the interface, by using the froth depth regulation device, and
   (ii) depth of water in the chamber, said regulation being responsive to movement of the location of the interface by at least one of the group comprising: controlling a physical parameter of the flow of introduced gas; controlling a physical parameter of the froth layer; and controlling an inlet flow of additional water;
   such that the water content of the froth layer near the uppermost region of the second chamber is controlled, to influence the concentration of the substance therein, and
   wherein for at least one of the first or the second chambers, the upward flow of gas and the production of the froth layer occurs in a batchwise operational manner.

6. A method as claimed in any one of claim 5, wherein the step of controlling the depth of water in a chamber by controlling an inlet flow of additional water is to replace water which, over time, is being removed into the froth layer.

7. A two-stage froth layer separation method for removal of an amount of a substance from water which is contaminated with the substance, the method comprising the steps of a first stage of:
   admitting an initial amount of the water, which includes an initial concentration of the substance, into a first chamber via an inlet thereinto;
   introducing a flow of gas into the first chamber, wherein said introduced gas induces a flow of water in the first chamber;
   producing a froth layer which is formed at, and which rises above, an interface with the said flow of water and of introduced gas in the first chamber, the froth layer including an amount of water and also a concentrated amount of the substance when compared with its initial concentration;
   removing at least some of the froth layer from an upper portion of the first chamber, and transferring said froth layer into a second chamber, such that either during or after said transfer step, the froth layer substantially collapses;
   whereupon when sufficient collapsed froth layer has been transferred into the second chamber, the method then comprises the steps of a second stage of:
   introducing a flow of gas into the second chamber, wherein said introduced gas induces a flow of water in the second chamber;
   producing a froth layer which is formed at, and which rises above, an interface with the said flow of water and of introduced gas in the second chamber, the froth layer including an amount of water and also a further concentrated amount of the substance when compared with its initial concentration in the second chamber;

removing at least some of the froth layer from an upper portion of the second chamber, and transferring said froth layer into a further vessel, prior to undergoing another treatment step.

8. A froth separation method as claimed in claim 7, wherein the froth layer in the first chamber included an amount of water of less than about 5% of the initial amount of the water in said chamber, and the concentrated amount of PFAS was more than about 20 times its initial concentration in the water.

9. A froth separation method as claimed in claim 7, wherein after producing the froth layer, the concentration of PFAS in the water which remains in the first chamber was less than about 1 µg/L.

10. A method of separating an amount of a substance from water which is contaminated with the substance, the method comprising the steps of:
admitting an amount of the water, which includes an initial concentration of the substance, into a chamber via an inlet thereinto;
introducing a flow of gas into the chamber, wherein said introduced gas induces the water in the chamber to flow, and produces a froth layer which is formed at, and which rises above, an interface with the said flow of water and of introduced gas in the chamber, the froth layer including an amount of water and also a concentrated amount of the substance when compared with its initial concentration;
controlling the water content of the froth layer above the interface by using one or more gas inlet flow pipes that are arranged to extend into the chamber interior and adapted for physically inducing a generally rotational or swirling flow of said introduced gas and water, in use said swirling flow having an axis of rotation aligned with an elongate axis of the chamber, said flow also being generally laminar along an interior peripheral wall of the chamber, thereby influencing the concentration of the substance in said froth layer; and
removing at least some of the froth layer from an upper portion of the chamber.

11. A method as claimed in claim 10, wherein the flow of gas and the production of the froth layer is continuous in operation.

12. The method as claimed in claim 1, wherein the steps for froth separation of the substance from the contaminated water are preceded by a process for removal of a majority of suspended solids from said contaminated water.

13. The method as claimed in claim 1, wherein the steps for froth separation of the substance from the contaminated water are preceded by a process for removal of a majority of non-dissolved hydrocarbons and suspended solids to a level which is suitable for discharge to stormwater.

14. The method as claimed in claim 1, wherein the froth layer is collapsed by using mechanical apparatus from the group comprising: a foam breaker, a vacuum extraction device, and a froth extraction head.

15. The method as claimed in claim 1, wherein the substance is at least one of a perfluoroalkyl or a polyfluoroalkyl substance (PFAS).

16. The method as claimed in claim 15, wherein the perfluoroalkyl or polyfluoroalkyl substance (PFAS) includes one or more of the groups comprising: perfluoro-octane sulfonate (PFOS); perfluoro-octanoic acid (PFOA); perfluoro-n-hexane sulfonic acid (PFHxS); perfluorononanoic acid (PFNA); perfluoro-decanoic acid (PFDA/Ndfda); 6:2-fluorotelomer sulphonate compounds (6:2 FTS); 8:2-fluorotelomer sulphonate compounds (8:2 FTS); perfluoro-octanoic acid (PFHpA); poly fluorinated carboxylic acids, alkyl sulfonates and alkyl sulfonamido compounds; fluorotelemeric compounds, each having differing carbon chain lengths; and including precursors of these.

* * * * *